(12) United States Patent
Nagura

(10) Patent No.: US 9,024,251 B2
(45) Date of Patent: May 5, 2015

(54) ENCODER HAVING A SCALE THAT INCLUDES BLOCK PATTERNS

(75) Inventor: Chihiro Nagura, Yokohama (JP)

(73) Assignee: Canon Kabushiki Kaisha (JP)

( * ) Notice: Subject to any disclaimer, the term of this patent is extended or adjusted under 35 U.S.C. 154(b) by 230 days.

(21) Appl. No.: 13/446,587

(22) Filed: Apr. 13, 2012

(65) Prior Publication Data

US 2012/0261562 A1    Oct. 18, 2012

(30) Foreign Application Priority Data

Apr. 13, 2011   (JP) ................. 2011-088814

(51) Int. Cl.
G01D 5/34         (2006.01)
G01D 5/347        (2006.01)

(52) U.S. Cl.
CPC .................. G01D 5/34707 (2013.01)

(58) Field of Classification Search
CPC ..... G01D 5/34; G01D 5/347; G01D 5/34707; G01D 5/34715; G01D 5/34723; G01D 5/3473; G01D 5/34746; G01D 5/34776; G01D 5/3478; G01D 5/34792; G01D 5/26
USPC .......... 250/231.1–231.18; 33/706, 707, 1 PT; 341/13, 14
See application file for complete search history.

(56) References Cited

U.S. PATENT DOCUMENTS

| | | | |
|---|---|---|---|
| 4,291,976 A * | 9/1981 | McMahon | 341/14 |
| 5,069,547 A | 12/1991 | Huggins et al. | |
| 5,699,058 A | 12/1997 | Yanagisawa et al. | |
| 5,889,280 A | 3/1999 | Matsuura | |
| 6,707,029 B1 | 3/2004 | Fuwa | |
| 6,765,195 B1 | 7/2004 | Leviton | |
| 8,188,420 B2 | 5/2012 | Lee | |
| 8,309,906 B2 | 11/2012 | Kapner et al. | |
| 2001/0011699 A1 | 8/2001 | Aoki | |

(Continued)

FOREIGN PATENT DOCUMENTS

| | | |
|---|---|---|
| DE | 102007025238 A1 | 12/2007 |
| EP | 2093543 A2 | 8/2009 |

(Continued)

OTHER PUBLICATIONS

European Extended Search Report issued in European counterpart application No. EP12163894.4, dated Jul. 23, 2014.

(Continued)

*Primary Examiner* — Thanh Luu
*Assistant Examiner* — Renee D Chavez
(74) *Attorney, Agent, or Firm* — Rossi, Kimms & McDowell LLP

(57) ABSTRACT

An encoder includes a scale that includes a plurality of unit block patterns arranged in a position measuring direction with a period of a pitch. A pattern of the unit block pattern has a symmetrical shape with respect to a symmetry line perpendicular to the position measuring direction. Each unit block pattern includes a plurality of divided sections along a direction perpendicular to the position measuring direction. An area ratio of the pattern which is a value made by dividing an area of the pattern in each divided section by an area of the divided section is different between two adjacent divided sections. The pattern in each divided section has a rectangular shape defined by two parallel lines that extend in the position measuring direction and two parallel lines that extend in the direction perpendicular to the position measuring direction.

17 Claims, 25 Drawing Sheets

(56) References Cited

U.S. PATENT DOCUMENTS

| | | |
|---|---|---|
| 2002/0014581 A1 | 2/2002 | Yamamoto et al. |
| 2011/0266424 A1 | 11/2011 | Kawatoko et al. |
| 2011/0304482 A1 | 12/2011 | Kapner et al. |
| 2012/0261561 A1 | 10/2012 | Horiguchi et al. |
| 2012/0262731 A1 | 10/2012 | Nagura |
| 2012/0265484 A1 | 10/2012 | Nagura |

FOREIGN PATENT DOCUMENTS

| | | | |
|---|---|---|---|
| EP | 2511669 | A2 | 10/2012 |
| JP | 55030603 | A | 3/1980 |
| JP | 09-196705 | A | 7/1997 |
| JP | 2007248359 | A | 9/2007 |
| JP | 2009198318 | A | 9/2009 |

OTHER PUBLICATIONS

European Extended Search Report issued in application No. EP12163898.5, dated Jul. 23, 2014. Cited in related U.S. Appl. No. 13/444,934.

European Extended Search Report issued in application No. EP12163893.6, dated Jul. 23, 2014. Cited in related U.S. Appl. No. 13/446,057.

European Extended Search Report issued in application No. EP12163899.3, dated Jul. 23, 2014. Cited in related U.S. Appl. No. 13/446,153.

* cited by examiner

ENCODER HAVING A SCALE THAT INCLUDES BLOCK PATTERNS

BACKGROUND OF THE INVENTION

1. Field of the Invention

The present invention relates to an encoder.

2. Description of the Related Art

Japanese Patent Laid-Open No. ("JP") 9-196705 proposes a method for removing a harmonic distortion (third harmonic component) of a modulated signal waveform in an encoder configured to receive light that has transmitted a scale grating and an index grating of a fixed unit, by converting an aperture width of the scale grating into a 2/3 pitch.

JP 9-196705 is disadvantageous because as the diffractive influence increases in the propagation from the scale grating to the index grating, the harmonic component is less likely to reduce.

SUMMARY OF THE INVENTION

The present invention provides an encoder that can stably restrain a harmonic distortion and precisely detect a position.

An encoder according to the present invention includes a light source, a photodetector, and a scale that includes a plurality of unit block patterns each having a pattern configured to transmit or reflect light from the light source toward the photodetector. The plurality of unit block patterns are arranged in a position measuring direction with a period of a pitch P. The pattern of the unit block pattern has a symmetrical shape with respect to a symmetry line perpendicular to the position measuring direction. Each unit block pattern includes a plurality of divided sections along a direction perpendicular to the position measuring direction. An area ratio of the pattern which is a value made by dividing an area of the pattern in each divided section by an area of the divided section is different between two adjacent divided sections. The pattern in each divided section has a rectangular shape defined by two parallel lines that extend in the position measuring direction and two parallel lines that extend in the direction perpendicular to the position measuring direction.

Further features of the present invention will become apparent from the following description of exemplary embodiments with reference to the attached drawings.

DESCRIPTION OF THE EMBODIMENTS

Figure 1:
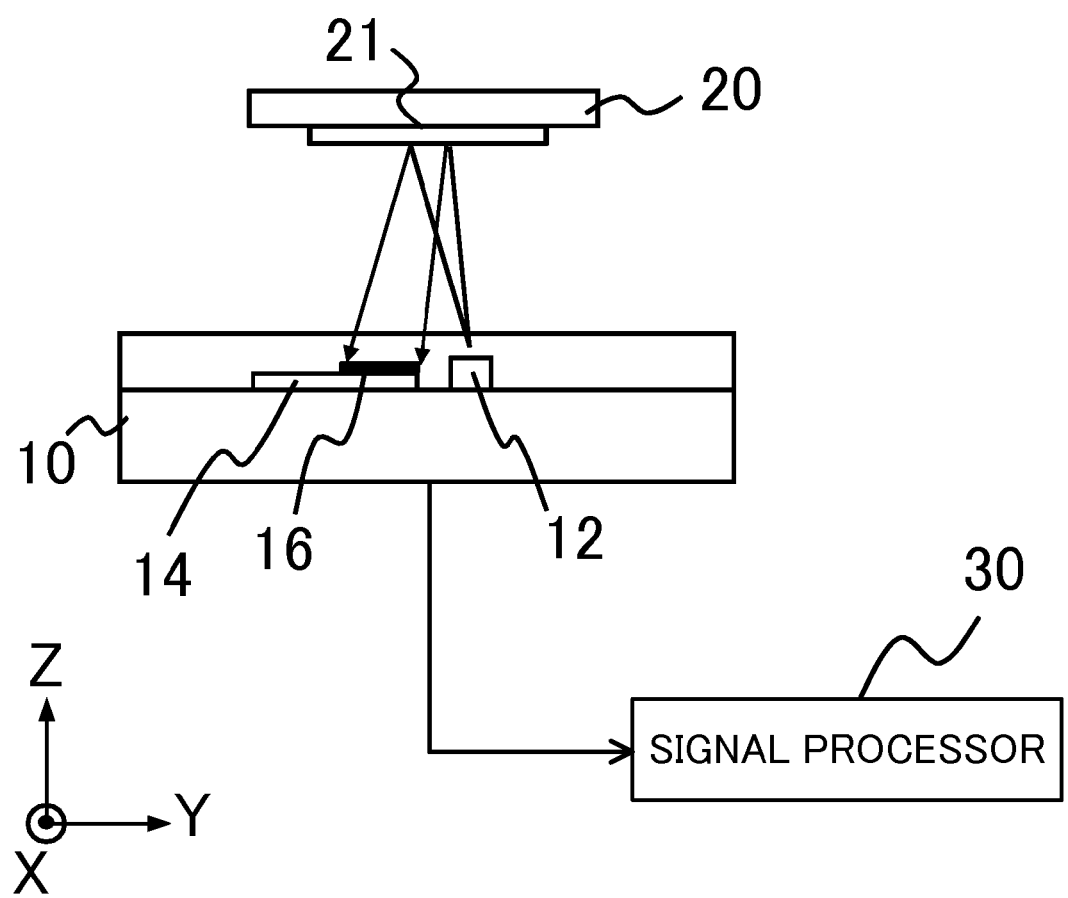
FIG. 1 is a block diagram of an encoder according to first, second, and third embodiments.

FIG. 1 is a block diagram of an encoder according to this embodiment. The encoder of this embodiment may serve as an incremental encoder or an absolute encoder.

The encoder of this embodiment is an optical encoder hereinafter. The encoder includes a sensor unit 10 attached to a fixed unit, a scale 20 attached to a movable unit (not illustrated), and a signal processor 30. The relationship between the fixed unit and the movable unit may be reversed, as long as the sensor unit 10 and the scale 20 are configured to move relatively to each other.

The sensor unit 10 is an integrated sensor unit of a light receiving unit and a light emitting unit in the same package, which includes a light source 12 and a light receiving IC 14 having a photodetector array 16.

The light source 12 may use a current confinement type of light emitting diode ("LED") having a wavelength $\lambda$=850 nm, a semiconductor laser, etc. The photodetector array 16 serves as a detector array that includes a plurality of detectors configured to detect the distribution of light from the pattern of the scale 20 and arranged in an X direction as a moving direction (position measuring direction) of the scale 20 (or the movable unit). The "position measuring direction," as used herein, means a direction in which the scale moves relative to the light source and the detector (or photodetector) or a direction in which a position of the scale is detectable relative to the light source and the detector. However, the movable unit is not limited to the scale but may be the light source and the detector. The positional information in the position measuring direction may be positional information of the scale (or a unit that is fixed relative to the scale) relative to the light source or detector (or a unit that is fixed relative to one of the light source and the detector) or information associated with this position.

The scale 20 has a track 21, which is patterned with a pattern row. The pattern row has a plurality of patterns made of a chromium reflective film on a glass substrate. The pattern is used to spatially modulate the distribution of the light. In particular, the pattern (or an area in which the pattern is formed on the scale) herein is a part that has a (reflective or transmitting) characteristic configured to guide light from a light source to the detector. The (pattern) part in which the pattern is formed on this scale and the non-patterned part have different optical characteristics, such as a reflective characteristic and a non-reflective (transmitting or absorptive) characteristic or a transmitting characteristic and a non-transmitting (reflective or absorptive) characteristic.

Each track 21 includes a plurality of areas, which are periodically arranged in a Y direction perpendicular to the X direction and have predetermined pitches (modulation periods) in the X direction. A "pitch" (modulation period), as used herein, means an X-directional space period of the patterns formed in the track. The pitch (modulation period) is a reciprocal of a spatial frequency (or a value proportioned to the reciprocal).

The photodetector array 16 in this embodiment receives light reflected on the pattern of the scale 20, but this embodiment is applicable to a case where the photodetector array 16 receives light that has transmitted through the pattern of the scale 20. In other words, it is sufficient that the photodetector array 16 receives the light from the pattern of the scale 20.

The signal processor 30 processes an output signal of the photodetector array 16 in the sensor unit 10, and converts it into positional information. The signal processor 30 also performs interpolation processing to a signal obtained by the sensor unit 10, and outputting of the positional signal.

The signal processor 30 includes a noise filter (not illustrated), an amplifier (not illustrated), an A/D converter (not illustrated), and a variety of units. The type of the unit included in the signal processor 30 depends upon whether the encoder serves as an incremental encoder or an absolute encoder.

In operation, a divergent light flux emitted from the light source 12 in the sensor unit 10 is irradiated onto the track 21 of the scale 20, and the light flux reflected on the track 21 is received by the photodetector array 16 in the sensor unit 10. The photodetector array 16 receives an image in which a reflectance distribution of the track 21 is magnified twice. The light flux received by the photodetector array 16 is converted into an electric signal, and sent to the signal processor 30. The signal processor 30 converts the output from the photodetector array 16 into positional information, and precisely obtains and outputs the information of the position of the scale 20.

First Embodiment

Figure 2A:
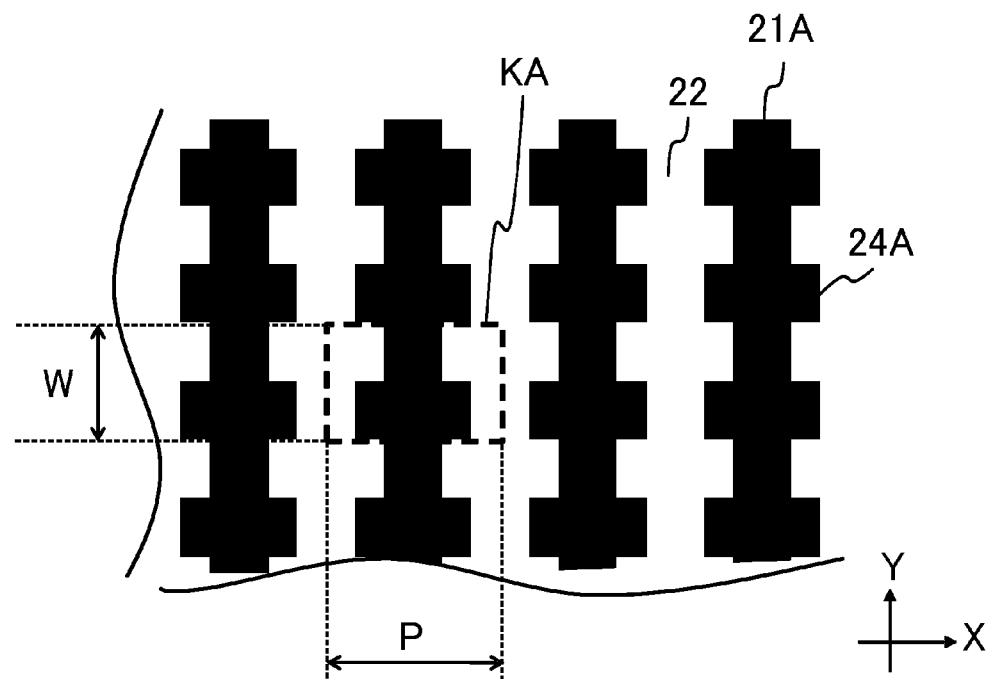
FIGS. 2A and 2B are partially enlarged plane views of a track according to the first embodiment.

FIG. 2A is a partially enlarged plane view of a track 21A according to a first embodiment applicable to the track 21 illustrated in FIG. 1. In the track 21A, a unit block pattern KA illustrated by a dotted line is periodically arranged in each of a moving direction (position measuring direction or X direction) of the scale 20 and a Y direction perpendicular to the position measuring direction. In FIG. 2A, a black portion (opening portion) is a reflective portion (reflector) configured to reflect light, and a white portion is a non-reflective portion (non-reflector) 22 configured to transmit or absorb the light (having a wavelength emitted from the light source). In other words, the opening portion of this embodiment means a reflective pattern and an opening ratio means an area ratio of the opening portion or the reflective portion to the whole area of the divided section. While the opening portion is the reflective portion in this embodiment, the present invention is not limited to this embodiment. For example, the transmitting portion may be the opening portion and the light source and the photodetector array of the sensor unit may be arranged on the opposite side with respect to the scale. In other words, the opening portion means a section that serves to guide the light from the light source in the scale to the photodetector array of the sensor unit.

Figure 2B:
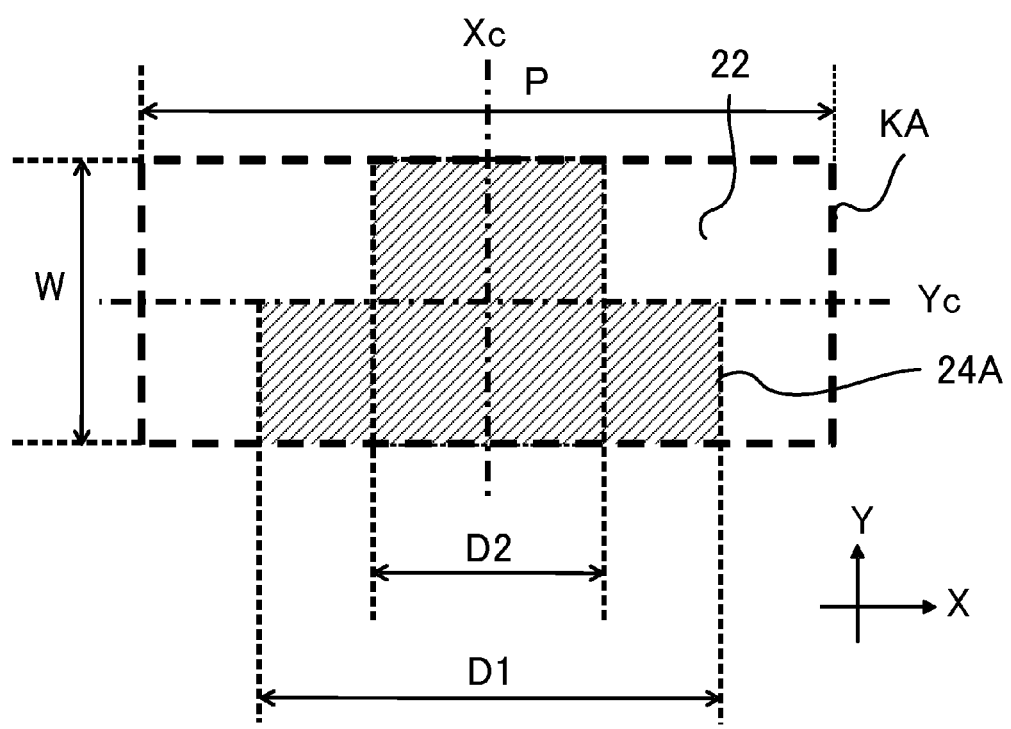

FIG. 2B is an enlarged plane view of the unit block pattern KA. The unit block pattern KA has a width P of 64 µm in the X direction and a width W of 100 µm in the Y direction, and includes a non-reflective portion (non-opening portion) 22 and a reflective portion (opening portion) 24A that is made of a reflective film and configured to reflect light.

A width in the X direction (position measuring direction) of the reflective portion 24A differs according to a Y-directional position in the unit block pattern KA. With respect to a symmetry line (second centerline) Yc in the Y direction which extends in the X direction and halves the unit block pattern KA, the X-directional width of the lower reflective portion 24A is D1=P·2/3 (with an opening ratio of 2/3) and the X-directional width of the upper reflective portion 24A is D2=P·1/3 (with an opening ratio of 1/3). The unit block pattern has two (divided) sections having different opening ratios along the Y direction perpendicular to the position measuring direction (or X direction). In each of these two sections, the pattern has a rectangular shape defined by a line that extends in the X direction and a line that extends in the Y direction. When a range of the pattern is defined by the Y-directional line, that pattern is likely to restrain the harmonic distortion more effectively than a pattern that is defined by a line that obliquely extends relative to the Y direction. In addition, a manufacture of the pattern defined by the Y-directional line becomes easier and thus its restraining effect of the harmonic distortion becomes more stable.

The opening ratio of 1/3 or 2/3 is substantially constant. The "substantial constant" means that the opening ratio in the position measuring direction for a length that is more than 80% (or 90%) as long as the width of each divided section in the Y direction perpendicular to the position measuring direction is 90% to 110% as long as the opening ratio at a certain position. Each divided section has a substantially constant opening ratio and a rectangular shape defined by two parallel lines that extend in the position measuring direction (X direction) and two parallel lines that extend in the Y direction perpendicular to the position measuring direction. This applies when the number of divided sections is more than two.

The reflective portion 24A has a convex shape and is symmetrical with respect to a symmetry line (first centerline) Xc of the unit block pattern KA in the X direction which extends in the Y direction and halves the unit block pattern KA. The symmetry herein does not requires a perfect symmetry, but allows the almost symmetry in which a correspondence of more than 90% (or 95%) between left and right pattern shapes with respect to the symmetry line (or a centerline of symmetry) when the reflective pattern is folded up respect to the symmetry line. In other words, the symmetry is satisfied when more than 90% of the reflective (pattern) on the left side of the symmetry line corresponds to the reflective (pattern) on the right side of the symmetry line.

Figure 3:
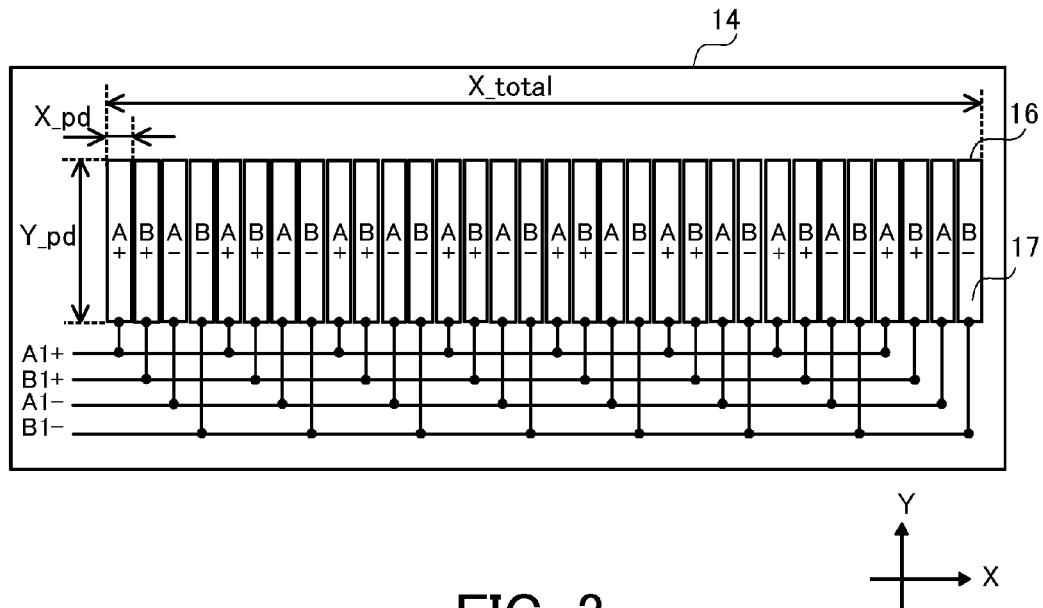
FIG. 3 is a plane view of a light receiving surface of a photodetector array (light sensitive element array, photo acceptance unit) according to the first embodiment.

FIG. 3 is a plane view of the light receiving (detecting) surface of the photodetector array 16 according to the first embodiment. In the photodetector array 16, thirty-two light receiving elements 17 are arranged in the X direction with a pitch of 32 μm: One light receiving element 17 has a width X_pd of 32 μm in the X direction, and a width Y_pd of 800 μm in the Y direction. An overall width X_total of the photodetector array 16 is 1,024 μm.

Since the projected scale pattern is magnified twice, the detectable range on the scale is 400 μm in the Y direction and 512 μm in the X direction. There are four unit block patterns KA in the Y direction in the detectable range of the scale.

Figure 4A:
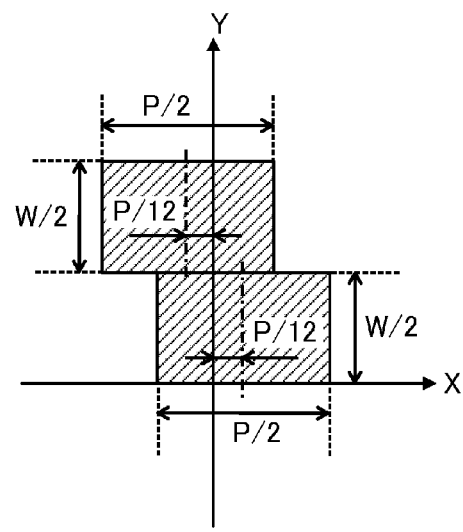
FIGS. 4A and 4B are views for explaining expressions 7, 8 and 9 according to the first embodiment.
Figure 4B:
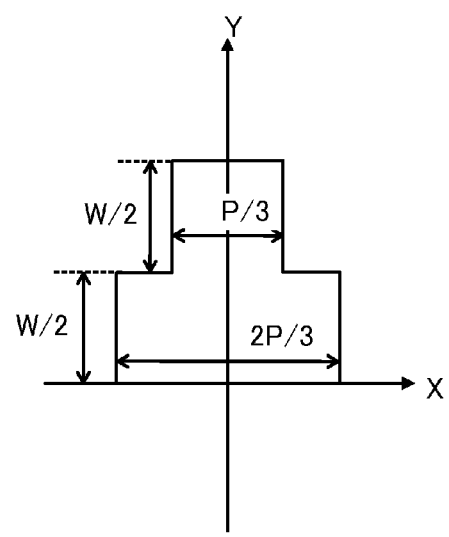

Referring now to FIGS. 4A and 4B, a description will be given of a designing method of the unit block pattern KA so as to remove a third harmonic component. Now assume R(x) as a total of a plurality of rectangular functions expressed by the following expression:

$$R(x)=A \times \text{rect}[(x-P \times N)/B+P/(2 \times B) \times (\ldots(((\pm 1/(2 \times a)) \pm 1/(2 \times b)) \pm 1/(2 \times c))\ldots)]-C \quad (1)$$

The rectangular function rect[$h$]=1 (|h|≤1/2) and rect [$h$]=0 (when |h|≤1/2 is not satisfied) (2)

"x" is a distance from the centerline Xc, A, B, C are arbitrary coefficients, a, b, c, ... are natural numbers, and N is an integer.

Herein, a, b, c ... correspond to orders of the harmonic components to be reduced. This embodiment intends to reduce the third harmonic component, and thus sets "a" to 3 and "b" and other orders to 0. B represents an X-directional width of the rectangular shape, and this embodiment sets B to P/2. Hence, R(x) can be expressed as follows using two rectangular functions R1(x) and R2(x) having a period P:

$$R1(x)=A \times \text{rect}(2 \cdot x/P-2N+1/6)-C \quad (3)$$

$$R2(x)=A \times \text{rect}(2 \cdot x/P-2N-1/6)-C \quad (4)$$

These expressions can be converted into the following expressions for one period (−P/2<x<P/2):

$$R1(x)=A \times \text{rect}(2 \cdot x/P+1/6)-C \quad (5)$$

$$R2(x)=A \times \text{rect}(2 \cdot x/P-1/6)-C \quad (6)$$

A sum Y(x) of the rectangular functions R1(x) and R2(x) is expressed as follows:

$$Y(x)=R1(x)+R2(x) \quad (7)$$

The unit block pattern KA is equal to the function Y(x) in the integration of the Y-directional width of the reflective portion 24A. This embodiment sets C to 0 so that the minimum value of the function Y(x) becomes 0, and sets A to W/2 so that the maximum value of the function Y(x) becomes the Y-directional width of the unit block pattern KA. This configuration eliminates an area having an opening ratio of 1 or 0 which does not contribute to the signal, and maximizes the signal efficiency. As a result, this embodiment converts expressions 5 and 6 into the following expressions 8 and 9. In each divided section, an area ratio of the pattern is a value a made by dividing an area of the pattern by an area of the divided section and can be expressed as a percentage value. The area ratio of the pattern is different between two adjacent divided sections.

$$R1(x)=W/2 \cdot \text{rect}(2 \cdot x/P+1/6) \quad (8)$$

$$R2(x)=W/2 \cdot \text{rect}(2 \cdot x/P-1/6) \quad (9)$$

R1(x) and R2(x) correspond to two rectangles illustrated in FIG. 4A, and Y(x) corresponds to a function illustrated in FIG. 4B. The reflective domain of the unit block pattern KA is similar to the function illustrated in FIG. 4B, and the unit block pattern KA illustrated in FIG. 2B is thus designed.

There are contained the unit block patterns KA for four periods in the Y direction in the detectable range on the scale. The integrated width of the reflective area in the Y direction contained in the detectable range on the scale is equal to the total of the plurality of rectangular functions expressed by 4A·rect(2·x/P−2N+( ... ((±1/2a)±1/2b)±1/2c) ... ))).

A description will now be given of a method of calculating a light intensity distribution on the light receiving surface of the photodetector array 16. The calculation utilizes the scalar diffraction theory. A light propagation to a scale surface distant from a point light source by a distance z1 can be expressed as follows using a photoelectric field distribution U1(x1):

$$U1(x1)=A/r1 \cdot \exp(i \cdot 2\pi/\lambda \cdot r1) \quad (10)$$

$$r1=\text{sqrt}(z1^2+x1^2) \quad (11)$$

A photoelectric distribution U2(x2) on the light receiving surface distant by a distance z2 of light that has passed an opening g(x) on the scale surface:

$$U2(x2)=\int U1(x1)/(i \cdot \lambda \cdot r2) \cdot g(x1) \cdot \exp(i \cdot 2\pi/\lambda \cdot r2)dx1 \quad (12)$$

$$r2=\text{sqrt}(z2^2+(x2-x1)^2) \quad (13)$$

The opening function g(x) is a function that sets the opening (or pattern) to 1 and the light shield to 0 in the scale. As a result, the light intensity distribution I(x2) on the light receiving surface is expressed as follows:

$$I(x2)=|U2(x2)^2| \quad (14)$$

When a distance between the light source and the scale is equal to a distance between the scale and the photodetector array, Z1=Z2=Z is established. This Z will be referred to as an optical gap hereinafter. The total light amount on the light receiving surface decreases as the optical gap Z increases, but the following characteristic of the harmonic component to a change of the optical gap will be normalized by the total light amount for each optical gap.

Figure 5A:
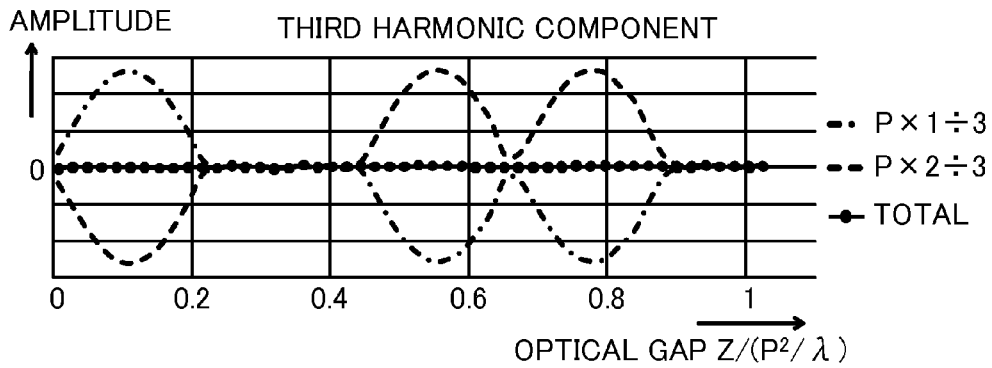
FIGS. 5A and 5B are graphs that illustrate a relationship between an optical gap and an amplitude of a third harmonic component in the structure illustrated in FIGS. 2A and 2B according to the first embodiment.

FIG. 5A is a graph that illustrates an amplitude of a third harmonic component contained in the light intensity distribution on the light receiving surface. The abscissa axis denotes an optical gap that is an optical distance between the light source 12/the photodetector array 16 and the scale 20. It is a normalized value using $P^2/\lambda$ where P is a period of the unit block pattern KA, and $\lambda$ is a wavelength of the light source 12. The ordinate axis denotes the amplitude, and its plus and minus signs mean that corresponding phases are inverted by 180°.

Since the scale pattern is divided in the Y direction into a section with a grating opening ratio of D1=P·2/3 and a section with a grating opening ratio of D2=P/3, the diffraction integration is calculated with a corresponding pattern function and opening ratio. An alternate long and short dash line corresponds to D2, and a broken line corresponds to D1.

It is understood that a diffracted image of each opening ratio contains a third harmonic component as the optical gap increases from 0. This means that the third harmonic component cannot be sufficiently reduced in the section having a large optical gap when the grating opening ratio is set to a uniform value of P·2/3 or P/3.

Now assume "m" as a maximum value of the natural numbers a, b, c, . . . . Since the modulation period of the m-th harmonic component in the gap direction is given by $(P/m)^2/\lambda$ from the abyss to the peak, the influence of the harmonic component cannot be sufficiently restrained unless the optical gap Z is set to $Z<(P/m)^2/\lambda$.

The diffracted images of the two types of opening ratios have equal amplitudes and inversed phases irrespective of the optical gap. Thus, when the light reflected on the grating of the two types of opening ratios is equally weighted and them enters the photodetector array 16, the width of the light receiving element 17 in the Y direction are electrically integrated and an output is obtained in which the third harmonic component is reduced.

A solid line in FIG. 5A illustrates the integrated result of the light receiving elements 17. The width W of the unit block pattern KA in the Y direction is set to a value of the Y-directional width of the detectable range on the scale divided by the integer so that the components of the two types of grating opening ratios are equally weighted.

When the distance between the light source 12 and the scale 20 is equal to the distance between the scale 20 and the photodetector array 16 like Z1=Z2, a twice image magnifying system is established. Thus, the width W may be set to a half of the Y-directional width of the photodetector array 16 divided by the integer. A similar effect can be obtained when it is set to a half of the Y-directional width of the light source 12 divided by the integer.

Figure 5B:
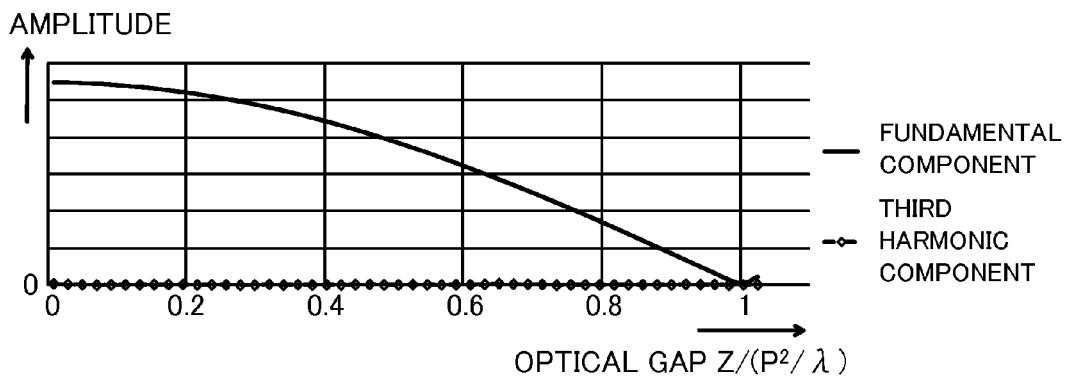

FIG. 5B is a graph that compares the absolute value amplitude of the fundamental component illustrated by a solid line with that of the third harmonic component illustrated by a line that contains white rhombi. It is understood that the third harmonic component that causes errors in the position detection is sufficiently restrained irrespective of the optical gap in comparison with the fundamental component that contributes to the signal.

Figure 6:
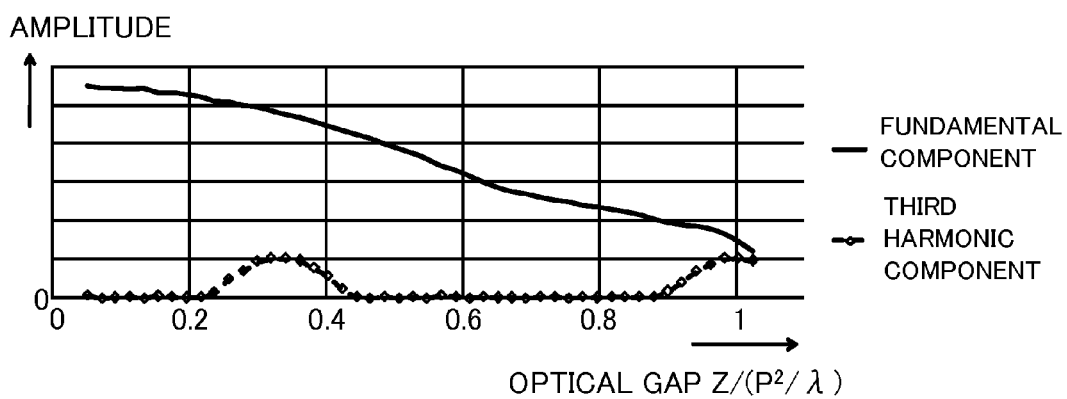
FIG. 6 is a graph that illustrates a result of a diffraction integration calculation when a slit of D1 and a slit of D2 illustrated in FIG. 2B are dispersed and alternated in the X direction.

FIG. 6 is a graph that illustrates the absolute value amplitude of the fundamental component illustrated by the solid line with that of the third harmonic component illustrated by the line that includes white rhombi when the D1 slits and the D2 slits are dispersed and alternated in the X direction. It is understood that the third harmonic component remains as the gap increases. In addition, the detecting phase varies at a period of 2·P due to the light amount intensity and the image magnification error in the X direction, and the linearity of the position signal lowers.

Another conceivable method for cancelling the harmonic component is to divide the section in the Y direction and to shift the pattern center so as to cancel the harmonic component but the detecting phase is likely to change as the scale obliquely moves. For example, when there is a light amount distribution in the Y direction or when there is an image magnification error, a light amount ratio of each shift pattern included in the detectable range changes due to the oblique movement and the detecting phase varies.

On the other hand, this embodiment divides the pattern section in the Y direction, provides the sections with different opening ratios, and aligns the center of each section of the reflective portion 24A in the moving direction. Thereby, the phase fluctuation caused by the light amount distribution is less likely to occur and the harmonic component is likely to decrease in a wide gap range.

An output from each light receiving element is connected to the four subsequent preamplifiers (not illustrated). Corresponding light receiving elements 17 are connected to output terminals A+, B+, A−, and B− (representative of A+ phase, B+ phase, A− phase, and B− phase) of the four preamplifiers, and four-phase sign wave outputs S(A+), S(B+), S(A−), and S(B−) are output.

With respect to the detection pitch, relative phases of the four-phase sine wave signals have the following relationship with S(A+) as a reference: S(B+) shifts by about +90°, S(A−) shifts by about +180°, and S(B−) shifts by about +270°.

The encoder of this embodiment serves as an incremental encoder configured to detect a relative position of the scale 20, and the signal processor 30 includes a phase acquirer.

The phase acquirer acquires a phase of the distribution of the light of the patterned area by performing an arc tangent operation for an output (digital) signal from the photodetector array 16.

The signal processor 30 generates two-phase sine wave signals S(A) and S(B) in which a DC component is eliminated, by performing the following operations with the four-phase sine wave outputs S(A+), S(B+), S(A−), and S(B−):

$$S(A)=S(A+)-S(A-) \quad (15)$$

$$S(B)=S(B+)-S(B-) \quad (16)$$

The phase acquirer of the signal processor 30 obtains a phase (signal) $\Phi 1$ of the distribution of the light from the patterned area by using the following expression. A TAN 2[Y, X] is an arc tangent function that determines a quadrant and converts it into a phase between 0 and $2\pi$:

$$\Phi 1 = A\ TAN\ 2[S(A), S(B)] \quad (17)$$

The signal processor 30 obtains an output of the phase acquirer as a relative position signal. Information of which period the scale 20 is located from the measurement starting position when the period is predetermined can be obtained, by counting a change of the relative position signal. The "relative position," as used herein, means a variation amount of the position or a variation direction or amount of the position per unit time or per sampling period (used to obtain the position signal). Alternatively, the relative position may be a variation direction or amount of the position at reference time (when the power is turned on or at predetermined reference timing).

A light flux from the light source 12 may be irradiated onto the mask, and the transmitting light may be irradiated onto the scale. The mask may have a pinhole, a single slit, a diffractive grating, and another shape, and a shape of a secondary light source may be determined so that the contrast of the fundamental component on the light receiving element is obtained.

As discussed, this embodiment can detect a waveform that is close to a sine wave in a wide optical gap range, and thus precisely detect the position.

Second Embodiment

Figure 7A:
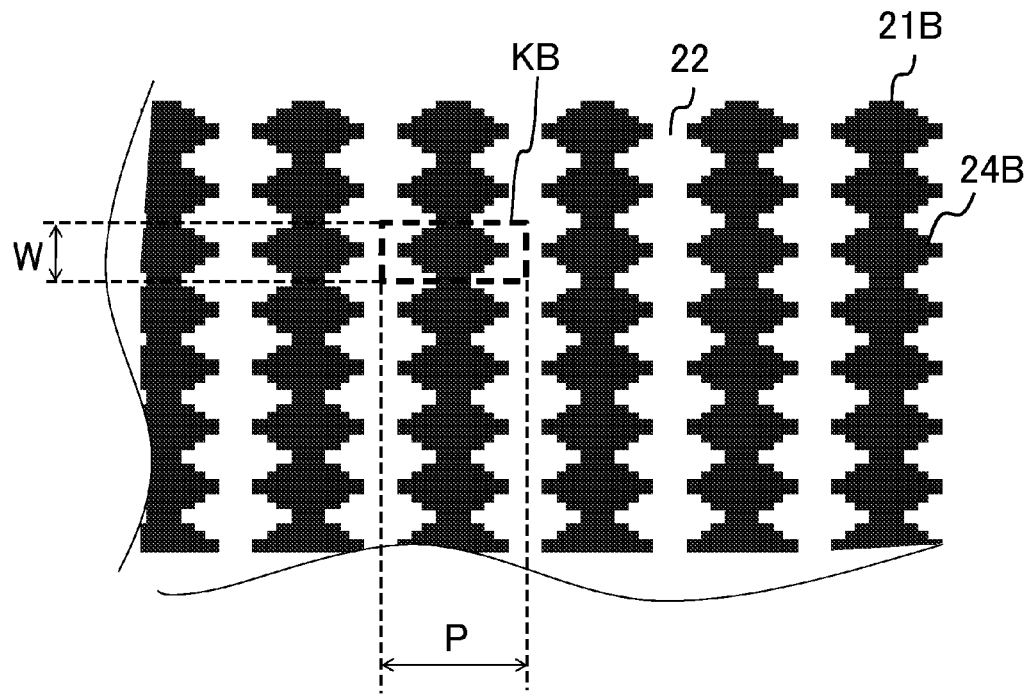
FIGS. 7A and 7B are partially enlarged plane views of a track according to the second embodiment.

FIG. 7A is a partially enlarged plane view of a track 21B according to a second embodiment applicable to the track 21 illustrated in FIG. 1. In the track 21B, a unit block pattern KB illustrated by a dotted line is periodically arranged in each of the X and Y directions of the scale 20.

Figure 7B:
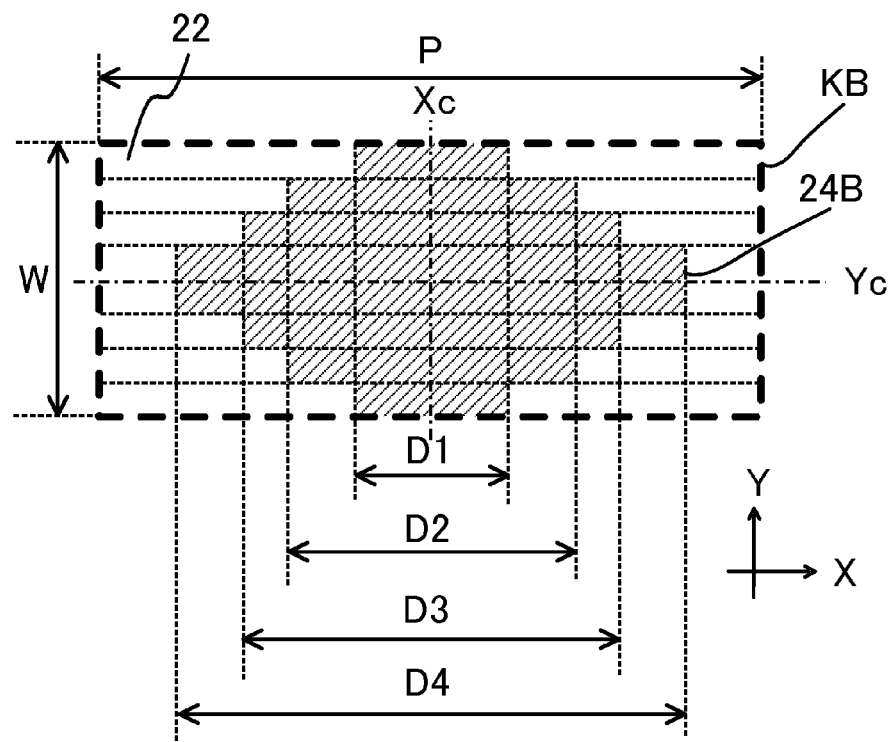

FIG. 7B is an enlarged plane view of the unit block pattern KB. The unit block pattern KB has a width P of 64 μm in the X direction and a width W of 100 μm in the Y direction, and includes a non-reflective portion 22 and a reflective portion 24B.

A width of the reflective portion 24B in the X direction differs according to a position in the unit block pattern KB in the Y direction. In sections with a distance Y of Y<W·1/8 from the centerline Yc, the reflective portion 24B is formed in a range with a distance X of X<P·23/60 from the centerline Xc.

In sections with a distance Y of W·1/8≤Y<W·2/8 from the centerline Yc, the reflective portion 24B is formed in a range with a distance X of X<P·17/60 from the centerline Xc. In sections with a distance Y of W·2/8≤Y<W·3/8 from the centerline Yc, the reflective portion 24B is formed in a range with a distance X of X<P·13/60 from the centerline Xc.

In sections with a distance Y of W·3/8≤Y<W·4/8 from the centerline Yc, the reflective portion 24B is formed in a range with a distance X of X<P·7/60 from the centerline Xc. The reflective portion 24B has an approximately rhombic shape and is symmetrical with respect to each of the centerlines Xc and Yc of the unit block pattern KB.

Figure 8A:
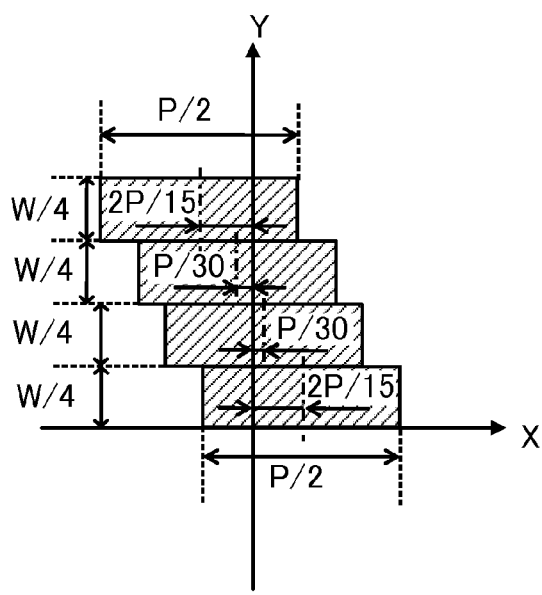
FIGS. 8A and 8B are views for explaining expressions 22 to 26 according to the second embodiment.
Figure 8B:
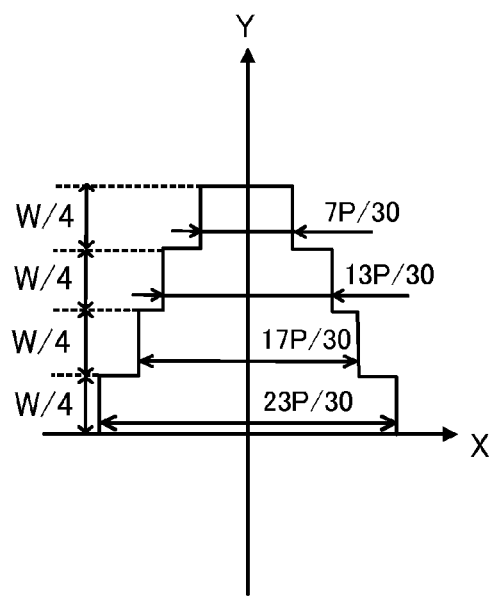

Referring now to FIGS. 8A and 8B, a description will be given of a designing method of the unit block pattern KB so as to remove components of a third harmonic component and a fifth harmonic component.

Initially, this embodiment sets "a" to 3 and "b" to 5 and "c" and other orders to 0 and B to P/2 in the expression 1. Then, similar to the first embodiment, the following four rectangular functions R1(x), R2(x), R3(x), and R4(x) are obtained:

$$R1(x)=A\times\text{rect}(2\cdot x/P+1/6+1/10)-C \quad (18)$$

$$R2(x)=A\times\text{rect}(2\cdot x/P+1/6-1/10)-C \quad (19)$$

$$R3(x)=A\times\text{rect}(2\cdot x/P-1/6+1/10)-C \quad (20)$$

$$R4(x)=A\times\text{rect}(2\cdot x/P-1/6-1/10)-C \quad (21)$$

A sum Y(x) of the rectangular functions R1(x), R2(x), R3(x), and R4(x) are expressed as follows:

$$Y(x)=R1(x)+R2(x)+R3(x)+R4(x) \quad (22)$$

The unit block pattern KB is equal to the function Y(x) in the integration of the width of the reflective portion 24B in the Y direction. This embodiment sets C to 0 so that the minimum value of the function Y(x) becomes 0, and sets A to W/4 so that the maximum value of the function Y(x) becomes the width of the unit block pattern KB in the Y direction. As a result, the expressions (18) to (21) becomes as follows:

$$R1(x)=W/4\times\text{rect}(2\cdot x/P+1/6+1/10) \quad (23)$$

$$R2(x)=W/4\times\text{rect}(2\cdot x/P+1/6-1/10) \quad (24)$$

$$R3(x)=W/4\times\text{rect}(2\cdot x/P-1/6+1/10) \quad (25)$$

$$R4(x)=W/4\times\text{rect}(2\cdot x/P-1/6-1/10) \quad (26)$$

R1(x), R2(x), R3(x), and R4(x) correspond to four rectangles illustrated in FIG. 8A, and Y(x) corresponds to a function illustrated in FIG. 8B. The reflective area of the unit block pattern KB may have a pyramid shape similar to that of the function illustrated in FIG. 8B, but a similar effect can be obtained with a symmetrical shape with respect to the Y direction as illustrated in FIG. 7B. The unit block pattern KB illustrated in FIG. 7B is thus designed.

Figure 9A:
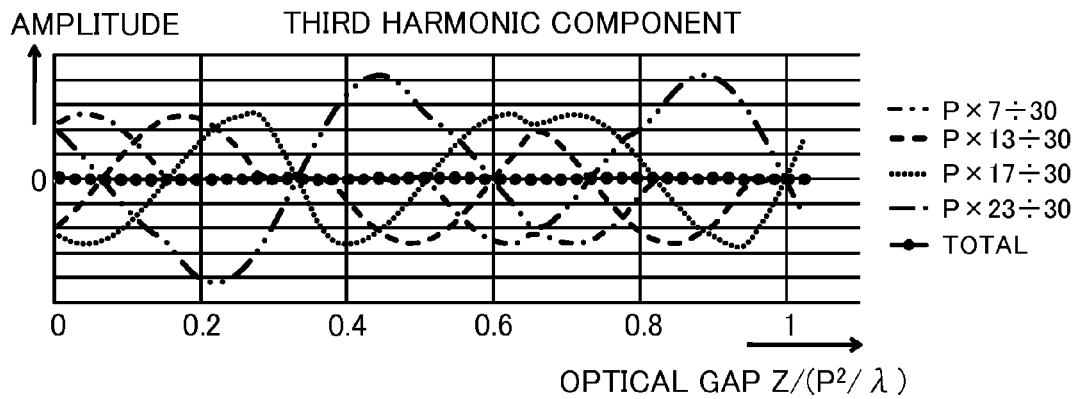
FIGS. 9A, 9B, and 9C are graphs that illustrate a relationship between an optical gap and an amplitude of a third harmonic component in the structure illustrated in FIGS. 7A and 7B according to the second embodiment.
Figure 9B:
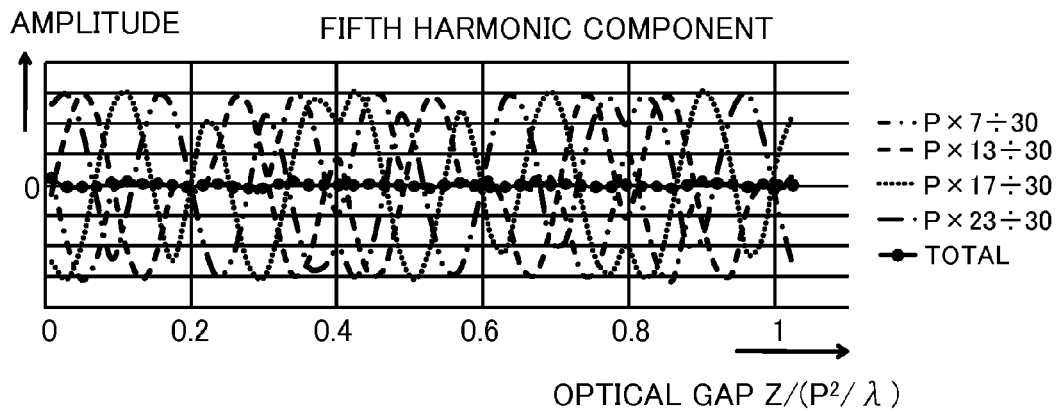

FIG. 9A is a graph that illustrates an amplitude of a third harmonic component contained in the light intensity distribution on the light receiving surface. FIG. 9B is a graph that illustrates an amplitude of a fifth harmonic component contained in the light intensity distribution on the light receiving surface. The abscissa axis denotes an optical gap that is an optical distance between the light source 12/the photodetector array 16 and the scale 20. It is a normalized value using $P^2/\lambda$ where P is a period of the unit block pattern KB, and λ is a wavelength of the light source 12.

Since the scale pattern is divided into four sections with grating opening ratios of D1=7P/30, D2=13P/30, D3=17P/30, and D4=23P/30 in the Y direction, the diffraction integration is calculated with a corresponding opening ratio. An alternate long and two short dashes line corresponds to D1, a broken line corresponds to D2, a dotted line corresponds to D3, and an alternate long and short dash line corresponds to D4.

A diffracted image of each opening ratio causes an amplitude variation and a phase inversion of a harmonic component as the gap changes, but the harmonic component is reduced irrespective of the gap in the summing result (solid line) of the four sections.

Figure 9C:
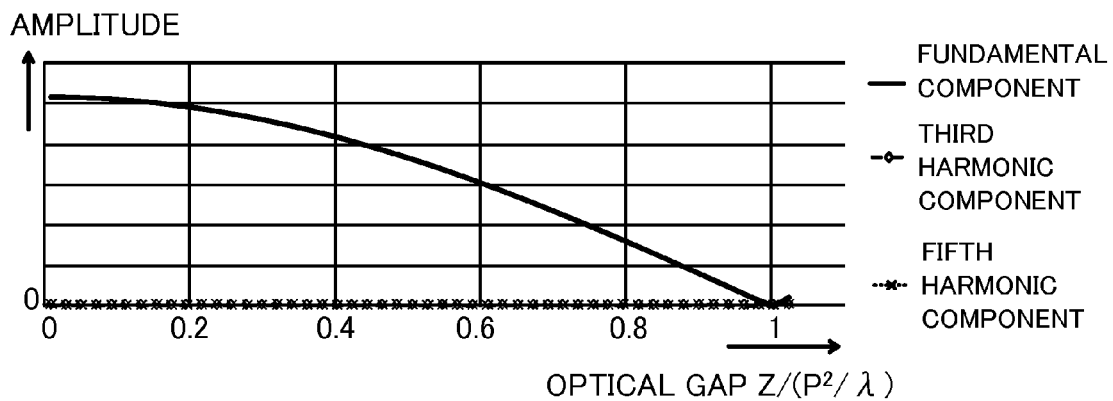

FIG. 9C is a graph that compares absolute value amplitudes among a fundamental component illustrated by a solid line, a third harmonic illustrated by a line that contains white rhombi, and a fifth harmonic component illustrated by a dotted line that contains X signs. It is understood that the third and fifth harmonic components that cause errors in the position detection are sufficiently restrained irrespective of the optical gap in comparison with the fundamental component that contributes to the signal.

The coefficient B of P/2 in the expression 1 can reduce the third and fifth harmonic components in the widest gap range, but the coefficient B of P/2 is not necessarily the best if a harmonic component remains other than the third and fifth components. An amplitude of a specific harmonic component other than the third and fifth harmonic components can be reduced near the designed center gap by shifting the coefficient B from P/2. In other words, the harmonic components can be minimized in the working gap range by slightly shifting the coefficient B from P/2 so as to reduce the influence of each amplitude of the harmonic component on the errors in the phase detection.

Figure 10:
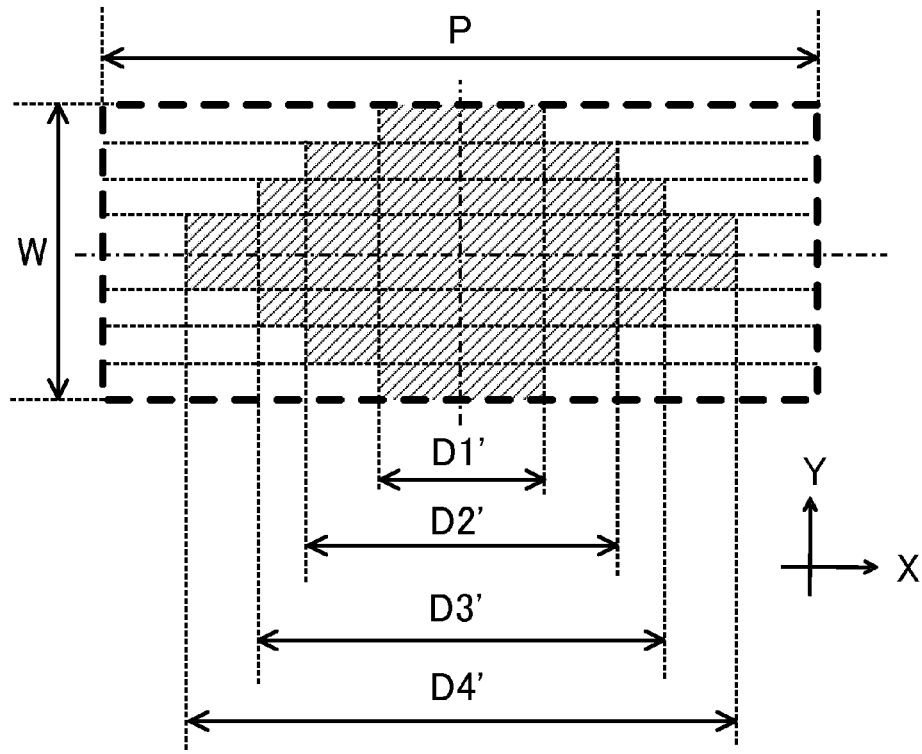
FIG. 10 is an enlarged plane view of a variation of FIG. 7B according to the second embodiment.

For example, FIG. 10 illustrates a unit block pattern KB when the coefficient B in expression 1 is set to P·29/60. This is an example designed to reduce the amplitudes of the third, fifth, and seventh harmonic components in the working gap range (between 0.25 and 0.3 mm). A size of a light emitting section in the light source is 2P or smaller in the position measuring direction. Since m=5, P=64 μm, and λ=0.85 μm, $(P/m)2/\lambda$ becomes about 0.19. In addition, Z is 0.25 to 0.3 mm, Z>(P/m)2/λ is satisfied.

At this time, the expressions 18 to 21 are replaced with the following expressions:

$$R1(x)=A\times\text{rect}(60\times x/(29\times P)+1/6+1/10)-C \quad (27)$$

$$R2(x)=A\times\text{rect}(60\times x/(29\times P)+1/6-1/10)-C \quad (28)$$

$$R3(x)=A\times\text{rect}(60\times x/(29\times P)-1/6+1/10)-C \quad (29)$$

$$R4(x)=A\times\text{rect}(60\times x/(29\times P)-1/6-1/10)-C \quad (30)$$

The scale pattern is made by dispersing and arranging the four sections with grating opening ratios D1'=13P/60, D2'=25P/60, D3'=33P/60, and D4'=45P/60.

Figure 11:
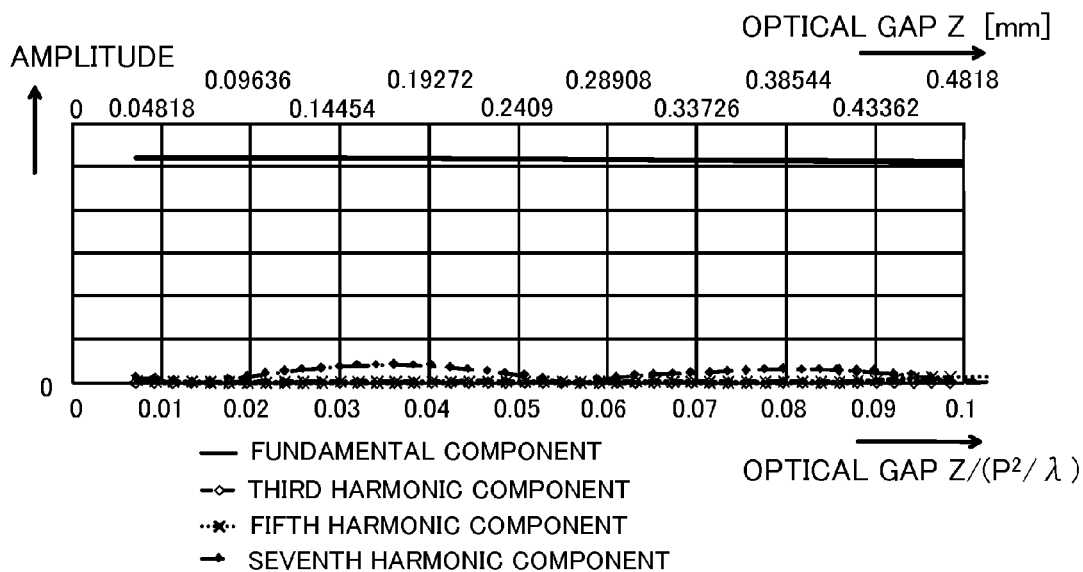
FIG. 11 is a graph that compares absolute value amplitudes among a fundamental component amplitude, a third harmonic component, a fifth harmonic component, and a seventh harmonic component in the structure illustrated in FIG. 10 according to the second embodiment.

FIG. 11 is a graph that compares absolute value amplitudes among a fundamental component illustrated by a solid line, a third harmonic illustrated by a line that contains white rhombs, a fifth harmonic component illustrated by a dotted line that contains X signs, and a seventh harmonic component illustrated by a broken line that contains black rhombi. It is understood that the third, fifth, and seventh harmonic components are reduced in the working gap range (between 0.25 and 0.3 mm). It is thus possible to simultaneously reduce the amplitudes of a plurality of orders of harmonic components.

Third Embodiment

Figure 12:
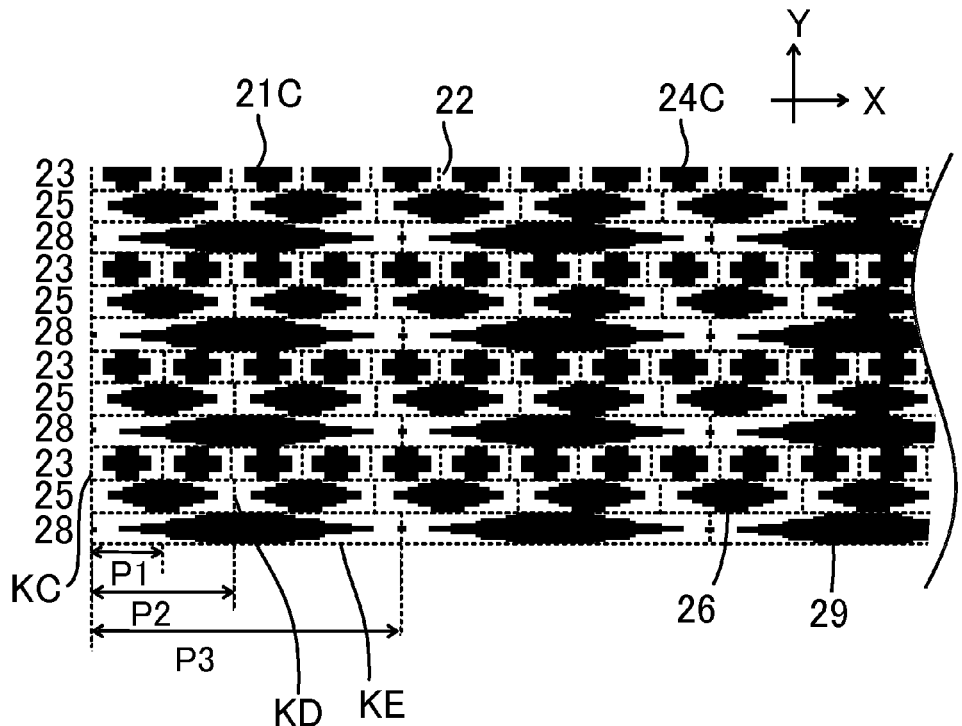
FIG. 12 is a partially enlarged plane view of a track according to a third embodiment.

FIG. 12 is a partially enlarged plane view of a track 21C according to a third embodiment applicable to the track 21 illustrated in FIG. 1. In the track 21C, three types of areas (23, 25, and 28) are alternated in the Y direction, and one track is a range that contains the overall width of FIG. 12 (an area scannable by the light receiving surface of the photodetector array 16). In FIG. 12, a white portion is the non-reflective portion 22 configured to transmit or absorb the light.

Figure 13A:
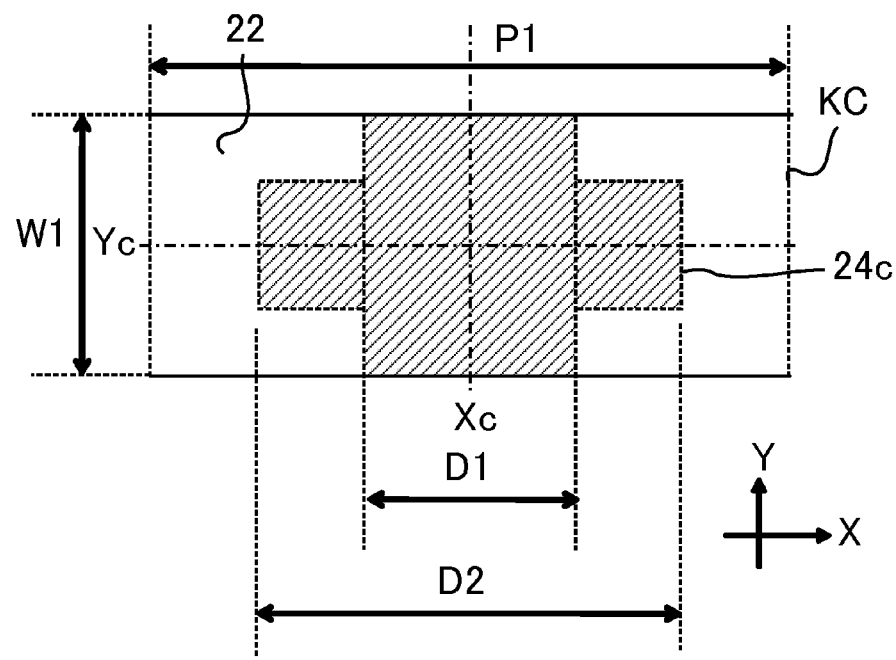
FIGS. 13A-13C are partially enlarged plane views of FIG. 12 according to the third embodiment.
Figure 13B:
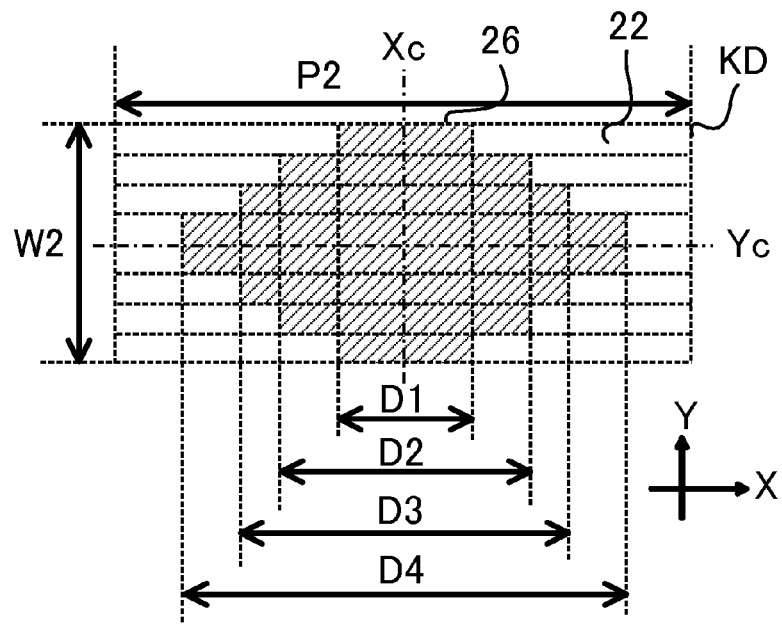
Figure 13C:
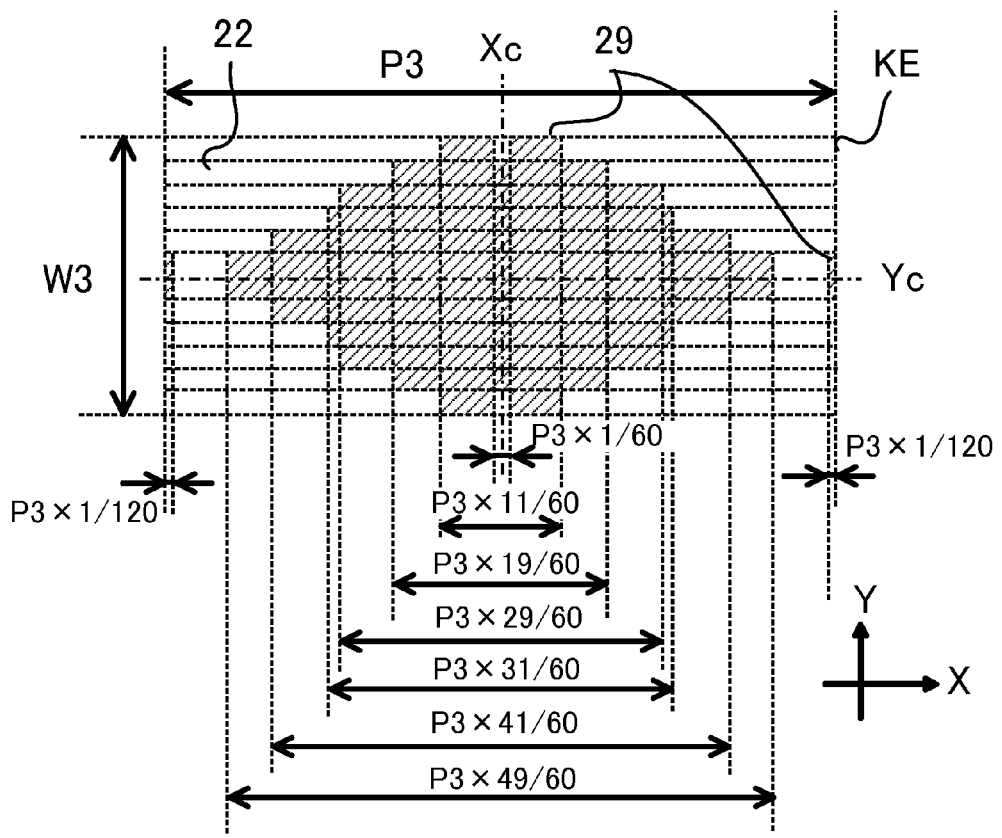

FIG. 13A is a plane view of a (first) unit block pattern KC of the (first) area 23 for one period in the X direction. FIG. 13B is a plane view of a unit block pattern KD of the (second) area 25 for one period in the X direction. FIG. 13C is a plane view of a unit block pattern KE of the (third) area 28 for one period in the X direction.

The area 23 includes a pattern row in which a plurality of unit block patterns KC illustrated in FIG. 13A are arranged for each pitch P1 (=127.204969 μm) in the X direction. A width of the area 23 in the Y direction is W1=50 μm. The pitch P1 corresponds to a (first) modulation period of the area 23.

As illustrated in FIG. 13A, a width of the reflective portion (first pattern) 24C in the X direction differs according to a position in the unit block pattern in the Y direction. In sections with a distance Y of Y<W1·1/4 from the centerline Yc, the reflective portion 24C is formed in a range with a distance X of X<P1·1/3 from the centerline Xc. In sections with a distance Y of W1·1/4≤Y<W1·1/2 from the centerline Yc, the reflective portion 24C is formed in a range with a distance X of X<P1·1/6 from the centerline Xc. The reflective portion 24C has a cross shape, and is symmetrically formed with respect to each of the centerlines Xc and Yc of the unit block pattern KC.

The area 25 includes a pattern row in which a plurality of (second) unit block patterns KD illustrated in FIG. 13B are arranged for each pitch P2 (=256 μm) in the X direction. A width of the area 25 in the Y direction is W2=50 μm. The pitch P2 corresponds to a (second) modulation period of the area 25.

As illustrated in FIG. 13B, a width of the reflective portion (second pattern) 26 in the X direction differs according to a position in the unit block pattern in the Y direction. In sections with a distance Y of Y<W2·1/8 from the centerline Yc, the reflective portion 26 is formed in a range with a distance X of X<P2·11/24 from the centerline Xc. In sections with a distance Y of W2·1/8≤Y<W2·2/8 from the centerline Yc, the reflective portion 26 is formed in a range with a distance X of X<P2·7/24 from the centerline Xc. In sections with a distance Y of W2·2/8≤Y<W2·3/8 from the centerline Yc, the reflective portion 26 is formed in a range with a distance X of X<P2·5/24 from the centerline Xc. In sections with a distance Y of W2·3/8≤Y<W2·4/8 from the centerline Yc, the reflective portion 26 is formed in a range with a distance X of X<P2·1/24 from the centerline Xc. The reflective portion 26 has an approximately rhombic shape, and is symmetrically formed with respect to each of the centerlines Xc and Yc of the unit block pattern KD.

The area 28 includes a pattern row in which a plurality of (third) unit block patterns KE illustrated in FIG. 13C are arranged for each pitch P3 (=553.513514 μm) in the X direction. A width of the area 28 in the Y direction is W3=50 μm. The pitch P3 corresponds to a (third) modulation period of the area 28.

As illustrated in FIG. 13C, a width of the reflective portion (third pattern) 29 in the X direction differs according to a position in the unit block pattern in the Y direction. In sections with a distance Y of Y<W3·1/12 from the centerline Yc, the reflective portion 29 is formed in ranges with a distance X of X<P3·49/120 and P3·59/120≤X<P3·60/120 from the centerline Xc.

In sections with a distance Y of W3·1/12≤Y<W3·2/12 from the centerline Yc, the reflective portion 29 is formed in a range with a distance X of X<P3·41/120 from the centerline Xc. In sections with a distance Y of W3·2/12≤Y<W3·3/12 from the centerline Yc, the reflective portion 29 is formed in a range with a distance X of X<P3·31/120 from the centerline Xc.

In sections with a distance Y of W3·3/12≤Y<W3·4/12 from the centerline Yc, the reflective portion 29 is formed in a range with a distance X of X<P3·29/120 from the centerline Xc. In sections with a distance Y of W3·4/12≤Y<W3·5/12 from the centerline Yc, the reflective portion 29 is formed in a range with a distance X of X<P3·19/120 from the centerline Xc.

In sections with a distance Y of W3·5/12≤Y<W3·6/12 from the centerline Yc, the reflective portion 29 is formed in a range with a distance X of P3·1/120≤X<P3·11/120 from the centerline Xc. The reflective portion 29 has an approximately rhombic shape, and is symmetrically formed with respect to each of the centerlines Xc and Yc of the unit block pattern KE.

A description will now be given of a design method of the unit block patterns KC, KD, and KE.

The unit block pattern KC of the area 23 is designed to eliminate the third harmonic component, and made by utilizing the designing method of the first embodiment.

The unit block pattern KD of the area 25 is designed to eliminate the second and third harmonic components. This embodiment sets "a" to 2, "b" to 3, and "c" and other orders to 0, and sets B to P/2 in the expression 1. Similar to the first embodiment, the following four rectangular functions R1(x), R2(x), R3(x), and R4(x) are obtained:

$$R1(x)=A\times \text{rect}(2\cdot x/P+1/4+1/6)-C \quad (31)$$

$$R2(x)=A\times \text{rect}(2\cdot x/P+1/4-1/6)-C \quad (32)$$

$$R3(x)=A\times \text{rect}(2\cdot x/P-1/4+1/6)-C \quad (33)$$

$$R4(x)=A\times \text{rect}(2\cdot x/P-1/4-1/6)-C \quad (34)$$

A sum Y(x) of the four rectangular functions R1(x), R2(x), R3(x), and R4(x) is expressed as follows:

$$Y(x)=R1(x)+R2(x)+R3(x)+R4(x) \quad (35)$$

The unit block pattern KD of the area 25 is equal to the function Y(x) in the integration of the width of the reflective portion 26 in the Y direction. This embodiment sets C to 0 so that the minimum value of the function Y(x) becomes 0, and sets A to W/4 so that the maximum value of the function Y(x) becomes the width of the unit block pattern KD in the Y direction.

Thereby, the expressions 31 to 34 become as follows:

$$R1(x)=W/4\times \text{rect}(2\cdot x/P+1/4+1/6) \quad (36)$$

$$R2(x)=W/4\times \text{rect}(2\cdot x/P+1/4-1/6) \quad (37)$$

$$R3(x)=W/4\times \text{rect}(2\cdot x/P-1/4+1/6) \quad (38)$$

$$R4(x)=W/4\times \text{rect}(2\cdot x/P-1/4-1/6) \quad (39)$$

Figure 14A:
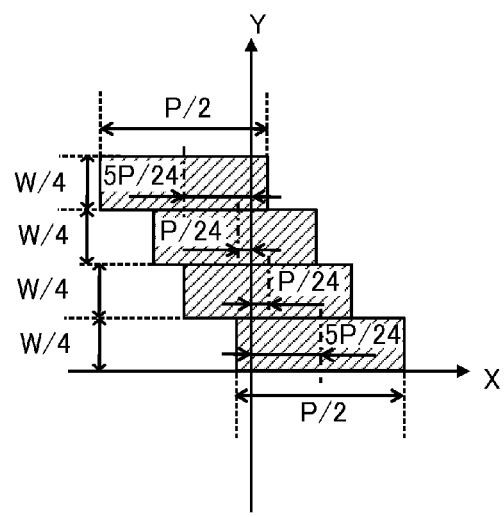
FIGS. 14A and 14B are views for explaining expressions 36 to 39 according to the third embodiment.
Figure 14B:
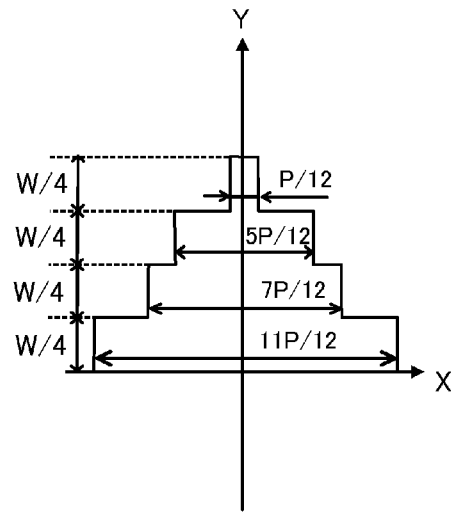

R1(x), R2(x), R3(x), and R4(x) correspond to four rectangles illustrated in FIG. 14A, and Y(x) corresponds to a function illustrated in FIG. 14B. The reflective section of the unit block pattern KD may be similar to a pyramid shape of the function illustrated in FIG. 14B, but a similar effect is obtained by forming the symmetrical shape with respect to the Y direction as illustrated in FIG. 13B or by exchanging the order of the four opening ratios. The unit block pattern KD illustrated in FIG. 13B is thus designed.

Figure 15A:
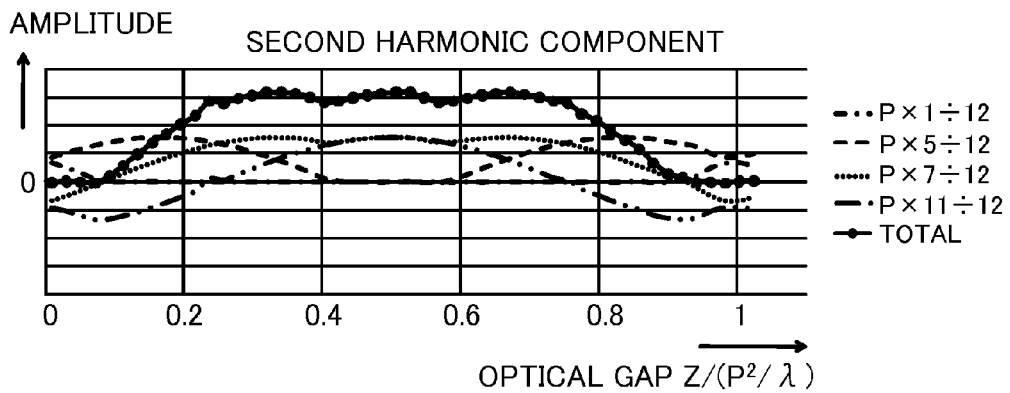
FIGS. 15A-15C are graphs that illustrate a relationship between the optical gap and the amplitudes of the harmonic components in the structure illustrated in FIG. 13B according to the third embodiment.
Figure 15B:
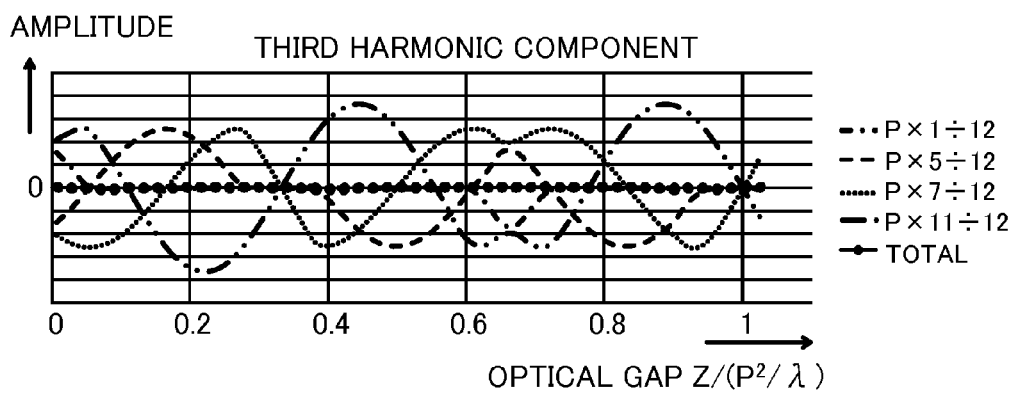

FIG. 15A is a graph that illustrates an amplitude of a second harmonic component contained in the light intensity distribution on the light receiving surface. FIG. 15B is a graph that illustrates an amplitude of a third harmonic component contained in the light intensity distribution on the light receiving surface. The abscissa axis denotes an optical gap that is an optical distance between the light source 12/the photodetector array 16 and the scale 20. It is a normalized value using $P^2/\lambda$ where P2 is a period of the unit block pattern KD, and $\lambda$ is a wavelength of the light source 12.

The scale pattern can be divided into four sections with grating opening ratios of D1=P/12, D2=5P/12, D3=7P/12, and D4=11P/12 in the Y direction, and the diffraction integration is calculated with a corresponding opening ratio. An alternate long and two short dashes line corresponds to D1, a broken line corresponds to D2, a dotted line corresponds to D3, and an alternate long and short dash line corresponds to D4.

As illustrated in FIG. 15A, the second harmonic component is reduced in a region in which the optical gap Z satisfies $Z<0.07\cdot(P^2/\lambda)$. In this embodiment, P=P2=256 μm and $\lambda$=850 nm are satisfied, and thus the second harmonic component can be reduced in a region in which the optical gap Z is less than about 5.4 mm. By reducing the second harmonic component, the interference is restrained between the image of the reflected pattern of the area 25 and the reflected image phase of the pattern of the area 23.

As illustrated in FIG. 15B, a diffracted image of each opening ratio causes an amplitude variation and a phase inversion of a harmonic component as the gap changes, but the third harmonic component is reduced irrespective of the gap in the summing result (solid line) of the four sections.

Figure 15C:
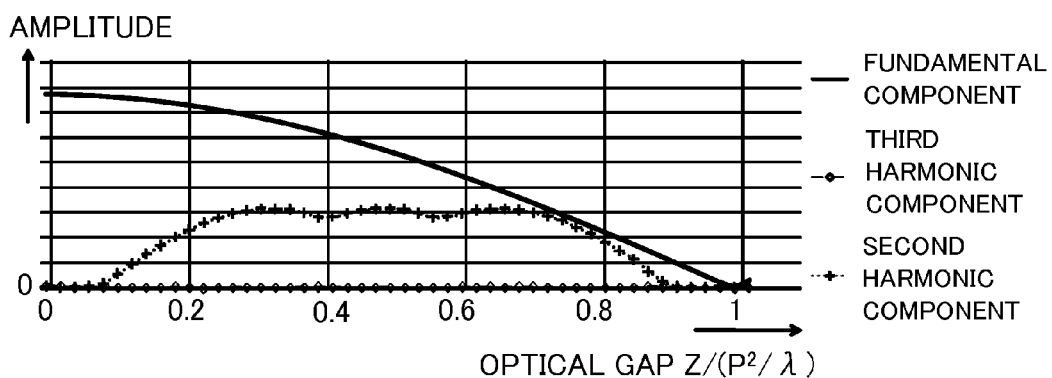

FIG. 15C is a graph that compares absolute value amplitudes among a fundamental component illustrated by a solid line, a second harmonic illustrated by a broken line that contains crosses, and a third harmonic illustrated by a line that contains white rhombi. It is understood that the third harmonic component that cause errors in the position detection is sufficiently restrained irrespective of the optical gap in comparison with the fundamental component that contributes to the signal.

The unit block pattern KE of the area 28 is designed to eliminate the second, third, and fifth harmonic components. Initially, this embodiment sets "a" to 2, "b" to 3, "c" to 5, "d" and subsequent orders to zero and the coefficient B to P/2 in the expression 1. Similar to the first embodiment, the following eight rectangular functions R1(x), R2(x), R3(x), R4(x), R5(x), R6(x), R7(x), and R8(x) are obtained:

$$R1(x)=A\times\text{rect}(2\cdot x/P+1/4+1/6+1/10)-C \quad (40)$$

$$R2(x)=A\times\text{rect}(2\cdot x/P+1/4+1/6-1/10)-C \quad (41)$$

$$R3(x)=A\times\text{rect}(2\cdot x/P+1/4-1/6+1/10)-C \quad (42)$$

$$R4(x)=A\times\text{rect}(2\cdot x/P+1/4-1/6-1/10)-C \quad (43)$$

$$R5(x)=A\times\text{rect}(2\cdot x/P-1/4+1/6+1/10)-C \quad (44)$$

$$R6(x)=A\times\text{rect}(2\cdot x/P-1/4+1/6-1/10)-C \quad (45)$$

$$R7(x)=A\times\text{rect}(2\cdot x/P-1/4-1/6+1/10)-C \quad (46)$$

$$R8(x)=A\times\text{rect}(2\cdot x/P-1/4-1/6-1/10)-C \quad (47)$$

A sum Y(x) of the rectangular functions R1(x), R2(x), R3(x), R4(x), R5(x), R6(x), R7(x), and R8(x) is expressed as follows:

$$Y(x)=R1(x)+R2(x)+R3(x)+R4(x)+R5(x)+R6(x)+R7(x)+R8(x) \quad (48)$$

The unit block pattern KE of the area 28 is equal to the function Y(x) in the integration of the width of the reflective portion 29 in the Y direction. This embodiment sets C to A/8 so that the minimum value of the function Y(x) becomes 0, and sets A to W/6 so that the maximum value of the function Y(x) becomes the width of the unit block pattern in the Y direction. As a result, Y(x) becomes a function made by summing the following eight rectangular functions and by removing a DC component:

$$R1'(x)=W/6\times\text{rect}(2\cdot x/P+1/4+1/6+1/10) \quad (49)$$

$$R2'(x)=W/6\times\text{rect}(2\cdot x/P+1/4+1/6-1/10) \quad (50)$$

$$R3'(x)=W/6\times\text{rect}(2\cdot x/P+1/4-1/6+1/10) \quad (51)$$

$$R4'(x)=W/6\times\text{rect}(2\cdot x/P+1/4-1/6-1/10) \quad (52)$$

$$R5'(x)=W/6\times\text{rect}(2\cdot x/P-1/4+1/6+1/10) \quad (53)$$

$$R6'(x)=W/6\times\text{rect}(2\cdot x/P-1/4+1/6-1/10) \quad (54)$$

$$R7'(x)=W/6\times\text{rect}(2\cdot x/P-1/4-1/6+1/10) \quad (55)$$

$$R8'(x)=W/6\times\text{rect}(2\cdot x/P-1/4-1/6-1/10) \quad (56)$$

Figure 16B:
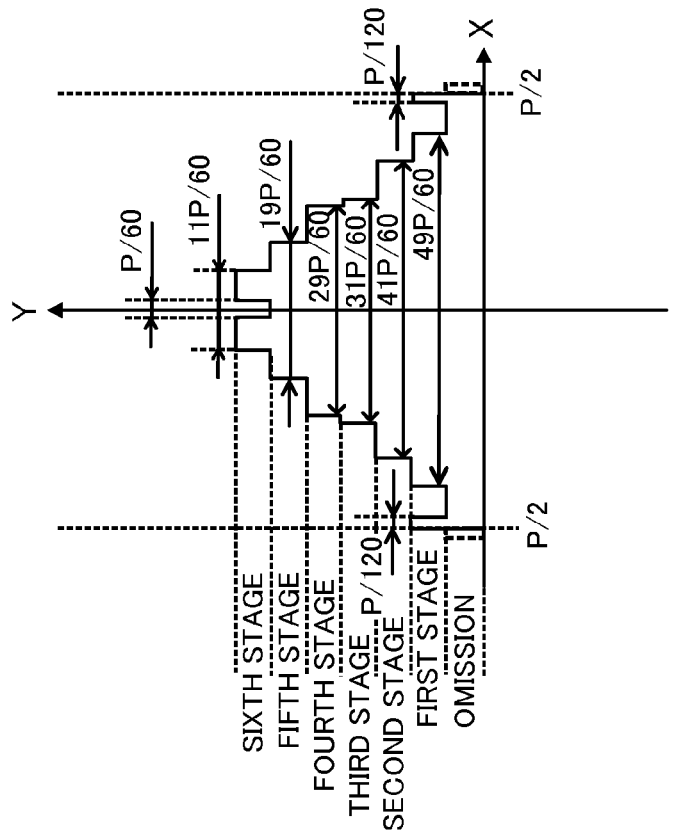
FIGS. 16A and 16B are views for explaining expressions 48 to 56 according to the third embodiment.
Figure 16A:
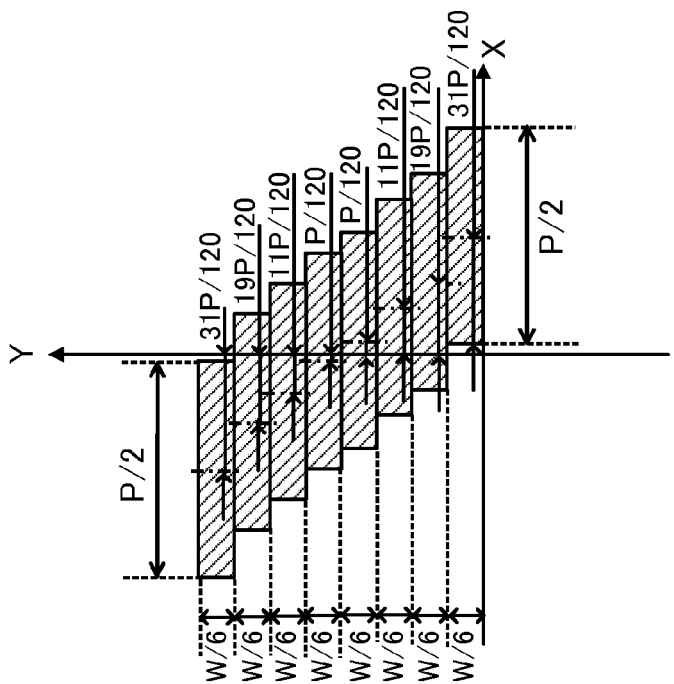

R1'(x), R2'(x), R3'(x), R4'(x), R5'(x), R6'(x), R7'(x), and R8'(x) correspond to eight rectangles illustrated in FIG. 16A, and Y(x) corresponds to a function illustrated in FIG. 16B.

At this time, the two rectangular functions of R1 and R8 project from the width P3 of the unit block pattern KE in the X direction by (P3)/120. Since the unit block patterns KE are adjacently arranged in the X direction, the function illustrated in FIG. 16B includes the rectangular function corresponding to a projecting width of (P3)/120 at both sides from the adjacent block.

When this function is separated in the Y direction, seven types of aperture patterns are formed. Since the sum Y(x) of the rectangular functions is this function from which the DC component of W/6 is removed, the minimum value becomes 0. The unit block pattern KE has six types of patterns, as illustrated in FIG. 13C.

Figure 17A:
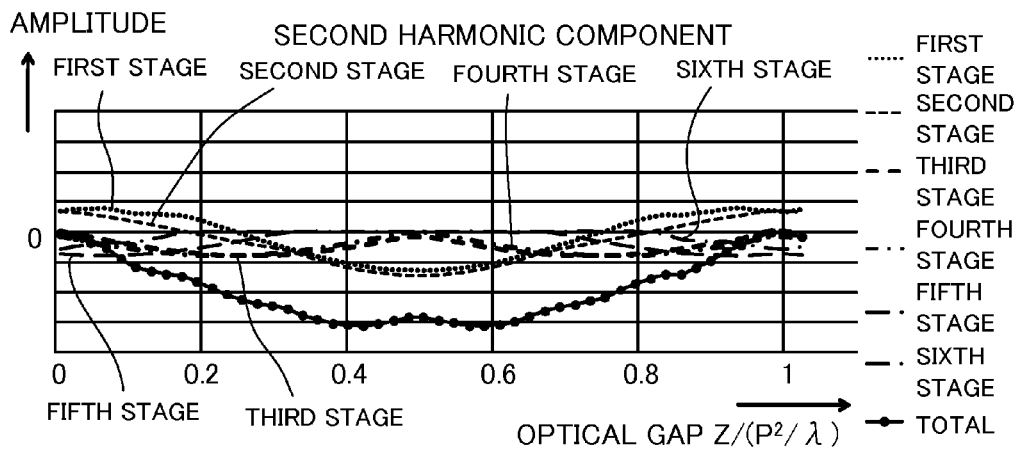
FIGS. 17A-17C are graphs that illustrate a relationship between the optical gap and the amplitudes of the harmonic components in the structure illustrated in FIG. 13C according to the third embodiment.
Figure 17B:
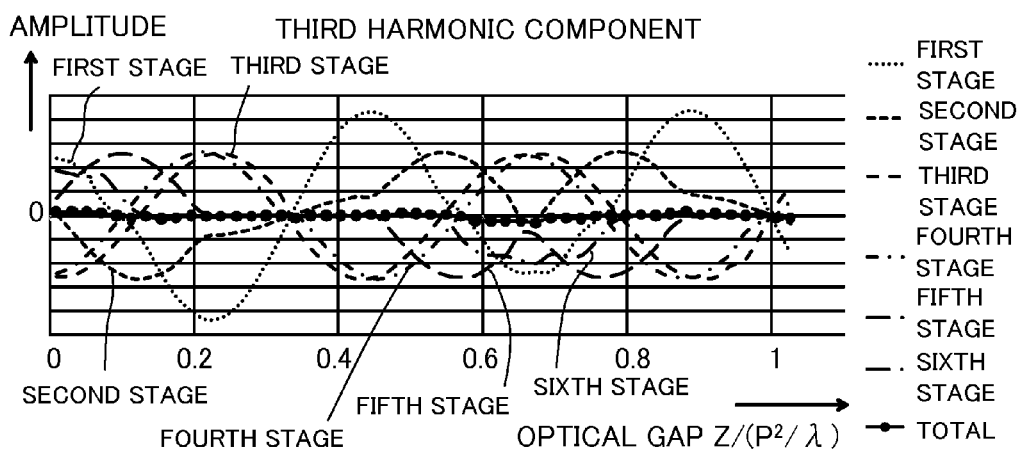
Figure 17C:
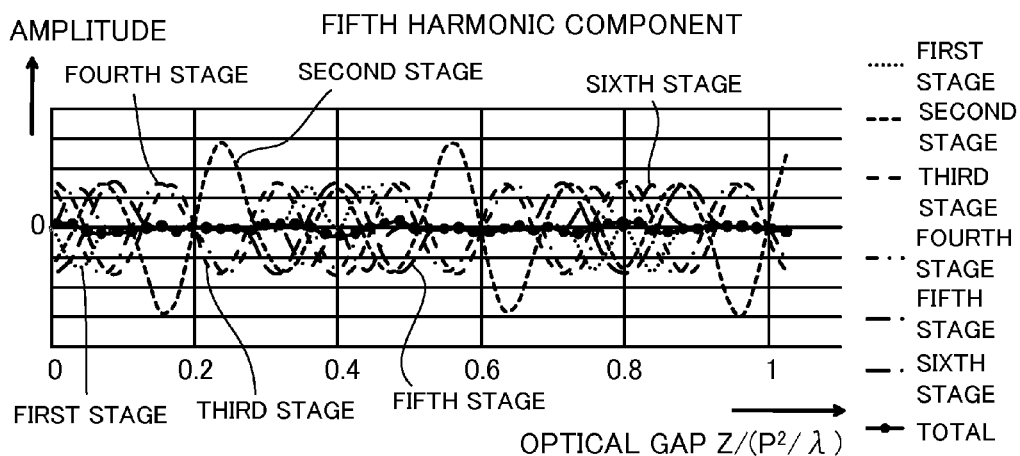

FIG. 17A is a graph that illustrates an amplitude of the second harmonic component contained in the light intensity distribution on the light receiving surface. FIG. 17B is a graph that illustrates an amplitude of the third harmonic component contained in the light intensity distribution on the light receiving surface. FIG. 17C is a graph that illustrates an amplitude of the fifth harmonic component contained in the light intensity distribution on the light receiving surface. The abscissa axis denotes an optical gap that is an optical distance between the light source 12/the photodetector array 16 and the scale 20. It is a normalized value using $P^2/\lambda$ where P=P3 is a period of the unit block pattern KE, and $\lambda$ is a wavelength of the light source 12.

Since the scale pattern is divided into six types of sections in the Y direction as illustrated by the function of FIG. 16B, the diffraction integration is calculated with a corresponding opening ratio. A dotted line denotes a first stage. A short broken line denotes a second stage. A long broken line denotes a third stage. An alternate long and two short dashes line denotes a fourth stage. An alternate long and short dash line (long broken line) denotes a fifth stage. An alternate long and short dash line (short broken line) denotes a sixth stage.

As illustrated in FIG. 17A, the second harmonic component is reduced in a region with in which the optical gap Z satisfies $Z<0.01\cdot(P^2/\lambda)$. Since $P=P3=553.513514$ μm and $\lambda=850$ nm in this embodiment, the second harmonic component can be reduced in a region in which the optical gap Z is less than about 3.6 mm. By reducing the second harmonic component, the interference is restrained between the image of the reflected pattern of the area 28 and the reflected image phase of the pattern of the area 25.

As illustrated in FIGS. 17B and 17C, a diffracted image of each opening ratio causes an amplitude variation and a phase inversion of a harmonic component as the gap changes, but the third and fifth harmonic components are reduced irrespective of the gap in the summing result (solid line) of the four areas.

Figure 18:
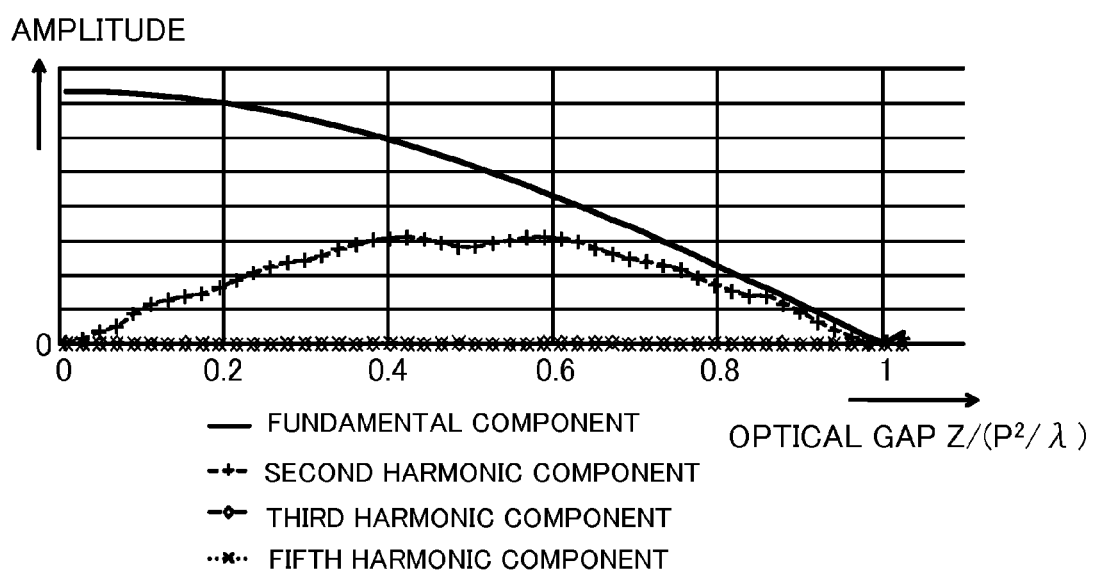
FIG. 18 is a graph that compares absolute value amplitudes among the fundamental component and the harmonic components.

FIG. 18 is a graph that compares absolute value amplitudes among a fundamental component illustrated by a solid line, a second harmonic illustrated by a broken line that contains crosses, a third harmonic illustrated by a line that contains white rhombi, and a fifth harmonic illustrated by a dotted line that contains X signs. It is understood that the third and fifth harmonic components that cause errors in position detections are sufficiently restrained and the second harmonic component is restrained to some extent irrespective of the optical gap in comparison with the fundamental component that contributes to the signal.

Figure 19A:
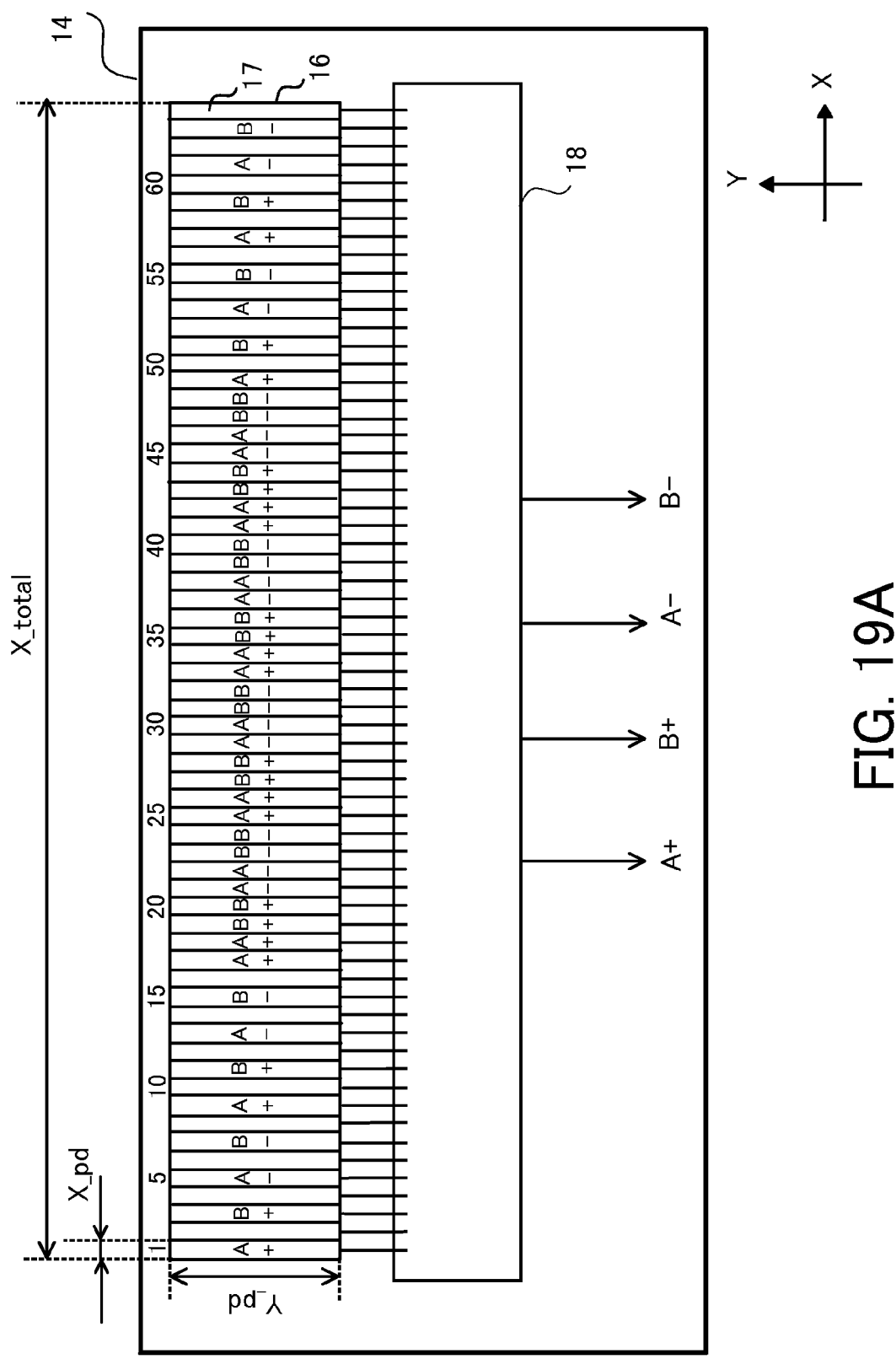
FIG. 19A is a plane view of a light receiving surface of a photodetector array configured to detect the area of FIG. 13A.
Figure 19B:
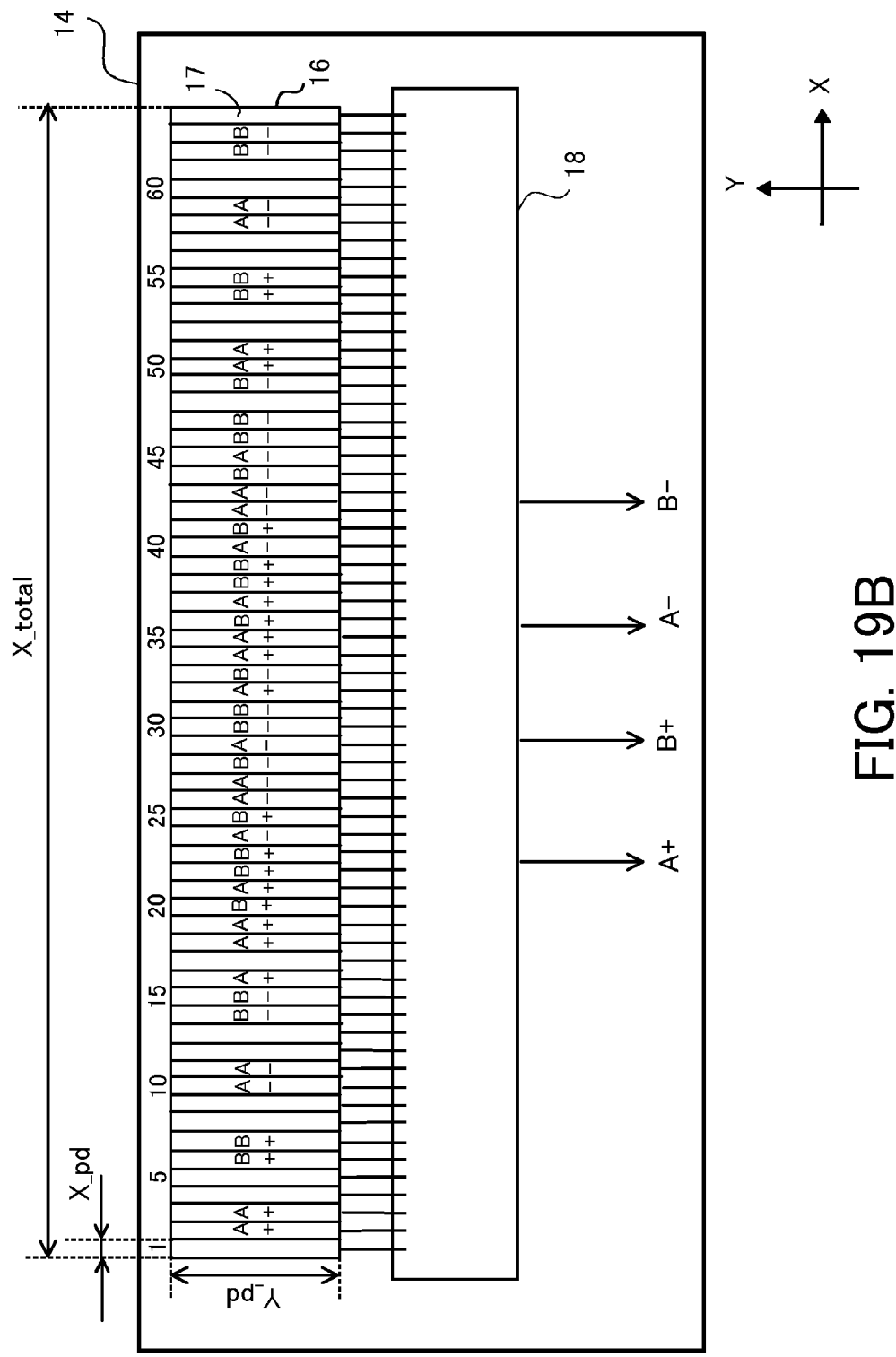
FIG. 19B is a plane view of a light receiving surface of a photodetector array configured to detect the area of FIG. 13B.
Figure 19C:
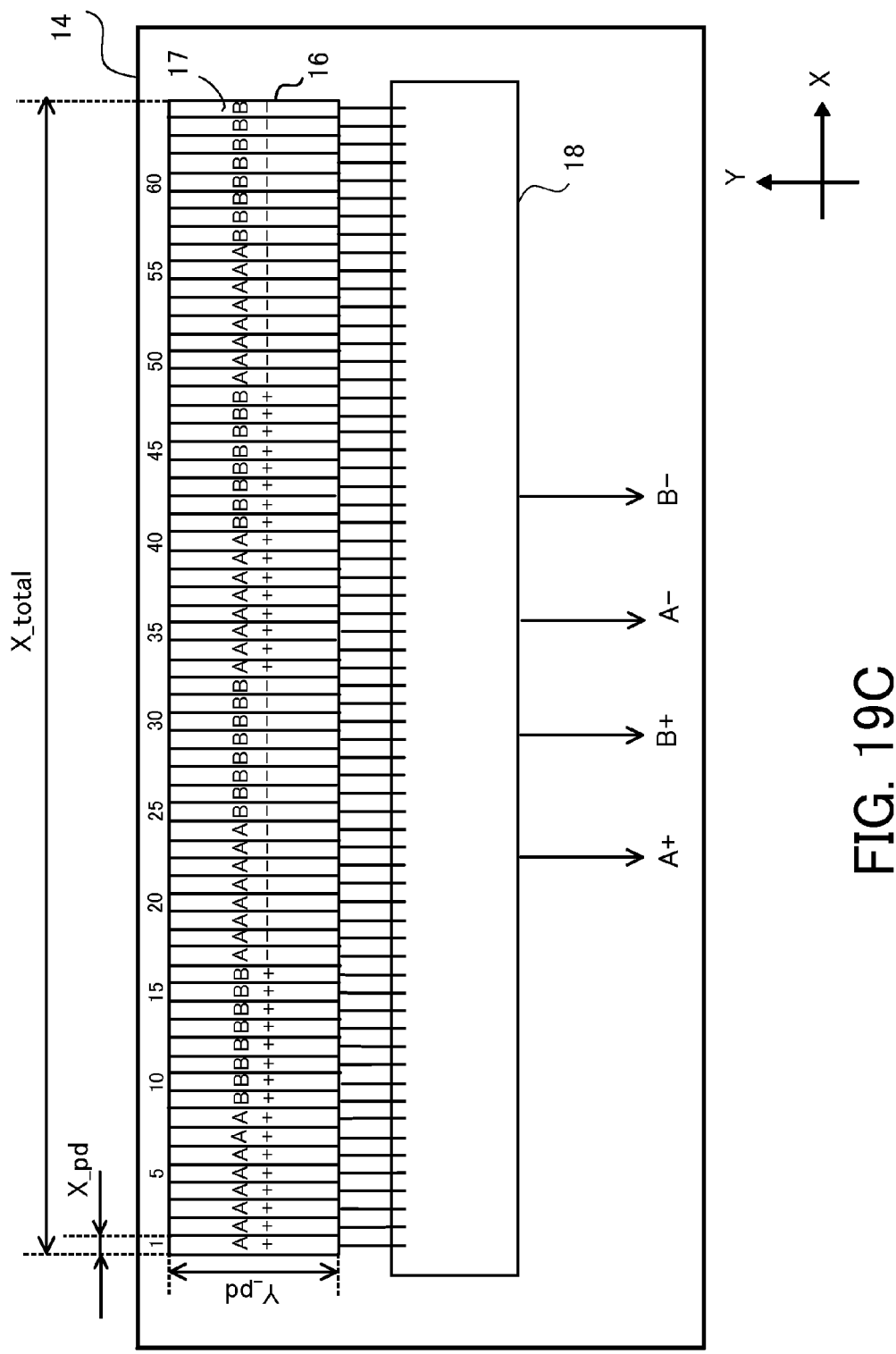
FIG. 19C is a plane view of a light receiving surface of a photodetector array configured to detect the area of FIG. 13C.

FIG. 19A is a plane view of the light receiving surface of a photodetector array 16 configured to detect the area 23C of FIG. 13A. FIG. 19B is a plane view of the light receiving surface of a photodetector array 16 configured to detect the area 25 of FIG. 13B. FIG. 19C is a plane view of the light receiving surface of a photodetector array 16 configured to detect the area 28 of FIG. 13C.

In the photodetector array 16, sixty-four light receiving elements 17 are arranged in the X direction with a pitch of 32 μm: One light receiving element 17 has a width X_pd of 32 μm in the X direction, and a width Y_pd of 900 μm in the Y direction. An overall width X_total of the light receiving element 16 is 2,048 μm.

Since the projected scale pattern is magnified twice, the detectable range on the scale is 450 μm in the Y direction and 1,024 μm in the X direction. Hence, three lines of the areas 23, 25, and 28 are included in the Y direction.

An output from each light receiving element is switched by a switching circuit 18, and selectively connected to the four subsequent preamplifiers (not illustrated). Corresponding light receiving elements 17 are connected to output terminals A+, B+, A−, and B− (representative of A+ phase, B+ phase A− phase and B− phase) of four preamplifiers, and the switching circuit 18 is configured to output four-phase sign wave outputs S(A+), S(B+), S(A−), and S(B−).

The signal processor 30 of this embodiment includes a signal separator. The signal separator is configured to separate the output of the photodetector array 16 into signals corresponding to respective areas of the track 21, and sends a signal used to switch a connection for a switching circuit 18. The signal can be separated using a fast Fourier transformation ("FFT") when the light receiving IC 14 has no switching circuit 18.

The switching circuit 18 can switch a connection between the light receiving element 17 and the output terminal on the basis of the input from the signal separator in the signal processor 30. As a result, an electrically added interval is switched in the plurality of light receiving elements 17.

When the input from the signal processing circuit 30 has a high level, the light receiving surface becomes as illustrated in FIG. 19A. The scale pattern has a detectable pitch of 128 μm (reflected image period of 256 μm), and can be used to detect the area 23.

When the input from the signal processing circuit 30 has a low level, the light receiving surface becomes as illustrated in FIG. 19B. The scale pattern has a detectable pitch of 256 μm (reflected image period of 512 μm), and can be used to detect the area 25.

When the input from the signal processing circuit 30 has a middle level, the light receiving surface becomes as illustrated in FIG. 19C. The scale pattern has a detectable pitch of 512 μm (reflected image period of 1,024 μm), and can be used to detect the area 28.

Relative phases of the four-phase sine wave signals have the following relationship with S(A+) as a reference about each detectable pitch: S(B+) shifts by about +90°, S(A−) shifts by about +180° and S(B−) shifts by about +270°.

The signal processor 30 generates two-phase sine wave signals S(A) and S(B) in which a DC component is eliminated, by performing the operations of the expressions 15 and 16 with the four-phase sine wave outputs S(A+), S(B+), S(A−), and S(B−).

The encoder of this embodiment serves as an absolute encoder. Hence, the signal processor 30 obtains information of an absolute position of the scale 20, and includes a first phase acquirer, a second phase acquirer, and a third phase acquirer.

The "absolute position," as used herein, means a position of a driver to an apparatus that includes the driver, and is different from a variation amount of the position to the position at the predetermined reference timing. Once the absolute position is determined, the position of the driver to the apparatus is uniquely determined. In the apparatus to which the encoder of this embodiment is attached, a scale is arranged onto one of the driver and the fixed or movable unit that does not move with the driver, and a detector array is arranged onto the other. Thereby, the position of the driver having the scale relative to the fixed unit (apparatus body side) having the detector array becomes detectable.

The first phase acquirer obtains a (first) phase Φ1 of the light distribution from the area 23 by performing an arc tangent operation illustrated in the expression 17 for the output signal (digital signal) from the photodetector array 16 (corresponding to the area 23).

The second phase acquirer obtains a (second) phase Φ2 of the light distribution from the area 25 by performing the following arc tangent operation for the output signal (digital signal) from the photodetector array 16 (corresponding to the area 25):

$$\Phi2 = A\ \text{TAN}\ 2[S(A), S(B)] \tag{57}$$

The third phase acquirer obtains a (third) phase Φ3 of the light distribution from the area 28 by performing the following arc tangent operation for the output signal (digital signal) from the photodetector array 16 (corresponding to the area 28):

$$\Phi3 = A\ \text{TAN}\ 2[S(A), S(B)] \tag{58}$$

The initial phases of three periodic patterns on the scale are set so that Φ1=Φ2=Φ3=0 at one end of the movable range (X=0 mm). Next, the phase signals Φa and Φb are obtained by the following operations:

$$\Phi a = \Phi1 - 2\cdot\Phi2 \tag{59}$$

$$\Phi b = \Phi2 - 2\cdot\Phi3 \tag{60}$$

Figure 20A:
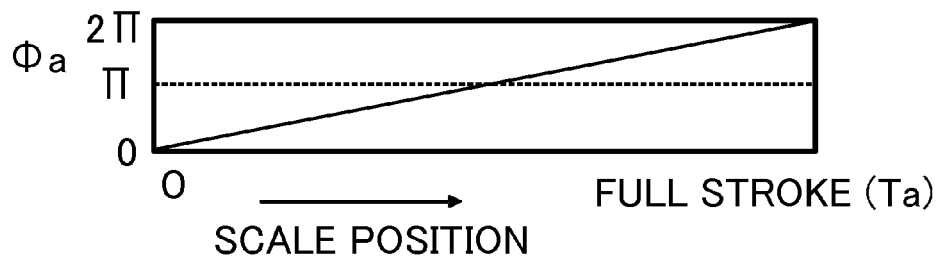
FIGS. 20A and 20B are views each of which illustrates a relationship between a phase signal and a scale signal.
Figure 20B:
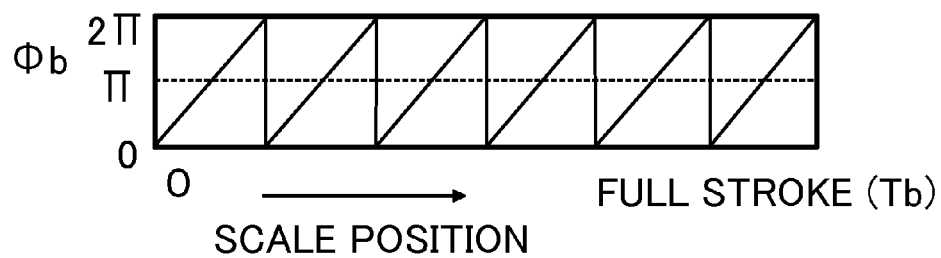

At this time, by repeating $\Phi a=\Phi a+2\pi$ for $\Phi a<0$ and $\Phi a=\Phi a-2\pi$ for $\Phi a>2\pi$, $\Phi a$ is converted into an output range between 0 and $2\pi$. This is true of $\Phi b$. Signal periods Ta and Tb for $\Phi a$ and $\Phi b$ in the X direction are Ta=20480 [µm] and Tb=3413.333 [µm]. FIG. 20A illustrates a relationship between $\Phi a$ and the scale position. FIG. 20B illustrates a relationship between $\Phi b$ and the scale position.

A description will now be given of processing used to obtain information of the absolute position using the positional information acquirer of the signal processor 30. Initially, the signal processor 30 obtains as the phase signal $\Phi a$ a superordinate signal Sc that is an absolute position signal, and the detectable full stroke becomes Ta=20,480 [µm].

Next, the signal processor 30 synchronizes the superordinate signal Sc with $\Phi b$, calculates which period of $\Phi b$ it is located based on the superordinate signal Sc, and obtains an absolute position signal (medium signal Sm in the following expression) having positional accuracy of $\Phi b$ by connecting $\Phi b$:

$$Sm=(2\pi\cdot ROUND[((Ta/Tb\cdot Sc-\Phi b)/(2\pi)]+\Phi b)\cdot Tb/Ta \qquad (61)$$

Herein, ROUND[x] is a function configured to convert a value into an integer closest to x.

Next, the signal processor 30 synchronizes the medium signal Sm with $\Phi 3$, calculates which period of $\Phi 3$ it is located based on the medium signal Sm, connects $\Phi 3$ with each other, and obtains an absolute position signal (a subordinate signal Sf in the following expression) having the positional accuracy of $\Phi 3$:

$$Sf=(2\pi\cdot ROUND[((Ta/P3\cdot Sm-\Phi 3)/(2\pi)]+\Phi 3)\cdot P3/Ta \qquad (62)$$

Next, the signal processor 30 synchronizes the subordinate signal Sf with $\Phi 1$, calculates which period of $\Phi 1$ it is based on the subordinate signal Sf, connects $\Phi 1$ with each other, and obtains an absolute position signal ABS having the positional accuracy of $\Phi 1$:

$$ABS=(ROUND[((Ta/P1\cdot Sf-\Phi 1)/(2\pi)]+\Phi 1/(2\pi))\cdot P1 \text{ [µm]} \qquad (63)$$

This processing can obtain information of the absolute position of the long stroke by using a highly precise incremental pattern signal.

Fourth Embodiment

Figure 21:
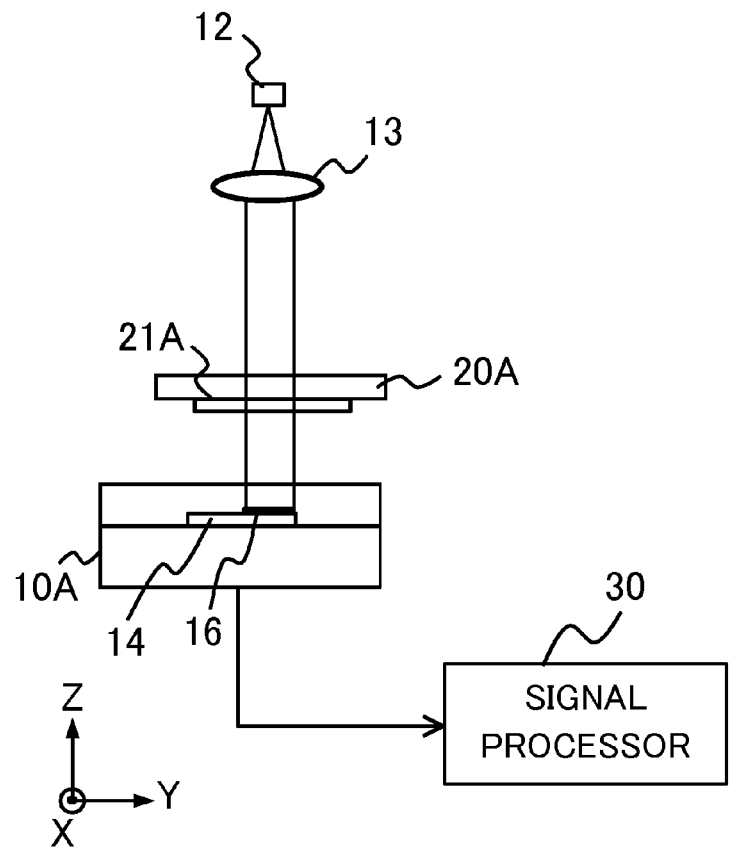
FIG. 21 is a block diagram of an encoder according to a fourth embodiment.

FIG. 21 is a block diagram of an encoder according to a fourth embodiment. According to the encoder of this embodiment, a sensor unit 10A is made by removing the light source 12 from the sensor unit 10 in the encoder illustrated in FIG. 1, and the photodetector array 16 receives transmitting light.

The light source 12 is attached to the fixed unit. A divergent light flux emitted from the light source 12 is collimated into a plane wave by a collimator lens 13 and irradiated onto a track 21A of a scale 20A. The light flux that has transmitted the track 21A is irradiated onto the photodetector array 16 in the sensor unit 10A, and the transmittance distribution of the track 21A is received as an actual size image.

The scale 20A of this embodiment has a pattern row illustrated in FIG. 2, but the non-reflective portion 22 serves as a light shielding portion and the reflective portion 24A serves as a light transmitting portion. The photodetector array 16 is arranged as illustrated in FIG. 3, but the projected image is an actual size rather than a magnified size and the size of the photodetector array 16 is reduced by half.

In the photodetector array 16, thirty-two light receiving elements 17 are arranged in the X direction with a pitch of 16 µm: One light receiving element 17 has a width X_pd of 16 µm in the X direction, and a width Y_pd of 400 µm in the Y direction. An overall width X_total of the light receiving element 16 is 512 µm.

Since the projected image has an actual size of the pattern on the scale, the detectable range on the scale is 400 µm in the Y direction and 512 µm in the X direction, similar to the light receiving surface size of the photodetector array 16. There are four unit block patterns KA in the Y direction in the detectable range of the scale.

The calculation of the light intensity distribution of the incident plane wave on the light receiving surface utilizes the following expression instead of the expression 10 as the photoelectric field distribution U1(x1) on the scale surface:

$$U1(x1)=A\cdot \exp(i\cdot 2\pi/\lambda\cdot z1) \qquad (64)$$

Figure 22A:
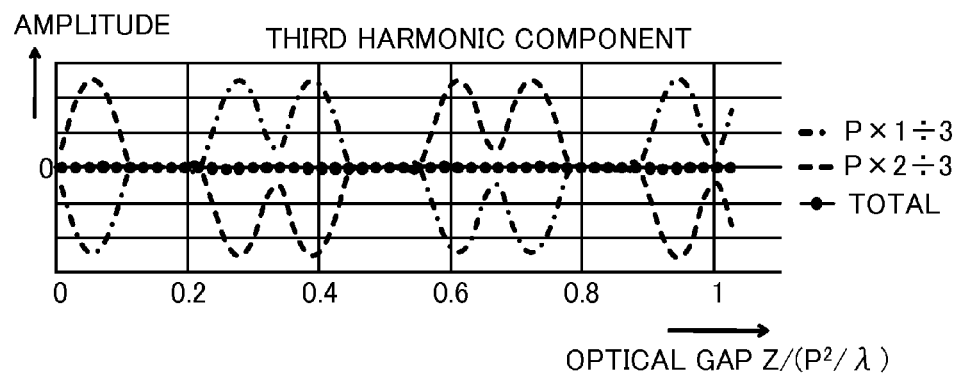
FIGS. 22A and 22B are graphs that illustrate between the optical gap and the amplitude of the harmonic component in the structure illustrated in FIG. 21 according to the fourth embodiment.

FIG. 22A is a graph that illustrates an amplitude of a third harmonic component contained in the light intensity distribution on the light receiving surface. The abscissa axis denotes an optical gap that is an optical distance between the photodetector array 16 and the scale 20A. It is a normalized value using $P^2/\lambda$ where P is a period of the unit block pattern KA, and $\lambda$ is a wavelength of the light source 12. The ordinate axis denotes the amplitude, and its plus and minus signs mean that corresponding phases are inverted by 180°.

Since the scale pattern can be divided into sections with grating opening ratios of D1 and D2 in the Y direction in FIG. 2B, the diffraction integration is calculated with a corresponding pattern function and opening ratio. An alternate long and short dash line corresponds to D2, and a broken line corresponds to D1.

FIG. 22A is a graph that illustrates an integrated result of the light receiving elements 17. Similar to the first embodiment, the third harmonic components contained in the diffracted images having two types of opening ratios are cancelled out each other, and the synthesized level is lowered irrespective of the optical gap.

Figure 22B:
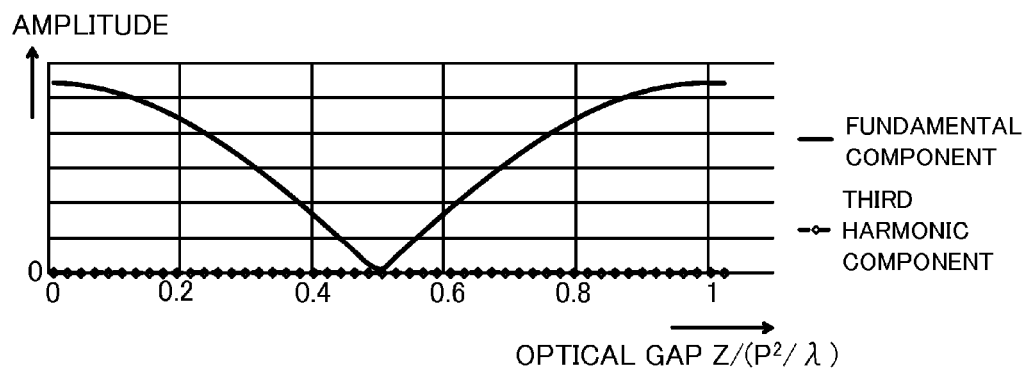

FIG. 22B is a graph that compares the absolute value amplitude of the fundamental component with that of the third harmonic component. Similar to the first embodiment, it is understood that the third harmonic component that causes errors in position detections is sufficiently restrained irrespective of the optical gap in comparison with the fundamental component that contributes to the signal. However, the modulation period to the optical gap (distance Z) becomes halved in comparison with an irradiation of a spherical wave onto the scale. Clearly, Z>(P/m)2/(2·$\lambda$).

Since the width W of the unit block pattern KA in the Y direction is set to the width of the detectable range on the scale divided by the integer so that components of two types of grating opening ratios are equally weighted. For an actual size system as in this embodiment, it is set to the width of the photodetector array 16 in the Y direction divided by the integer.

As discussed, even when the plane wave enters the scale, this embodiment provides an effect similar to that of the first embodiment.

Fifth Embodiment

Figure 23:
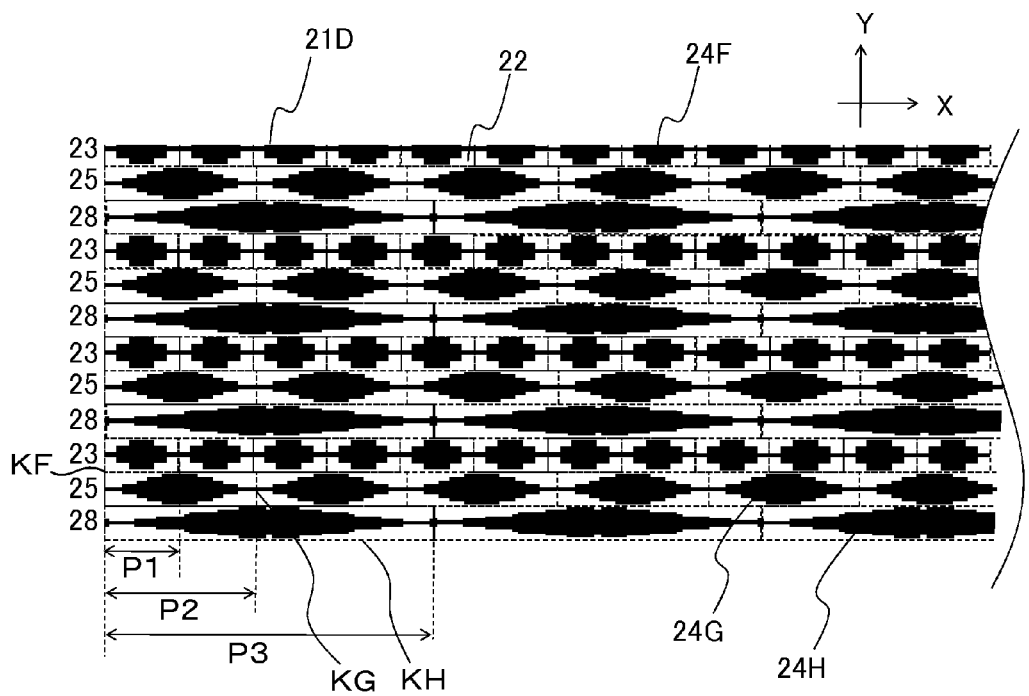
FIG. 23 is a partially enlarged plane view of a track according to a fifth embodiment.

FIG. 23 is a partially enlarged plane view of a track 21D according to a fifth embodiment applicable to the track 21 illustrated in FIG. 1. In the track 21D, three types of areas (23, 25, and 28) are alternated in the Y direction. In FIG. 23, a white portion is the non-reflective portion 22 configured to transmit or absorb the light.

Figure 24A:
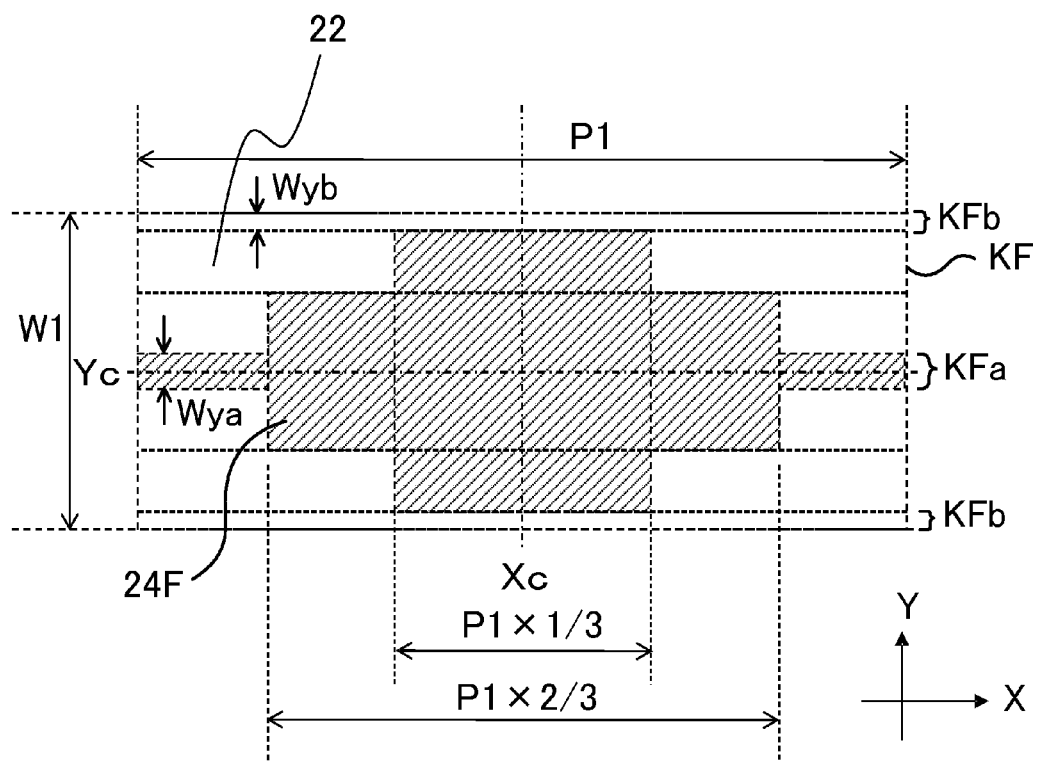
FIGS. 24A, 24B, and 24C are partially enlarged plane views of FIG. 23 according to the fifth embodiment.
Figure 24B:
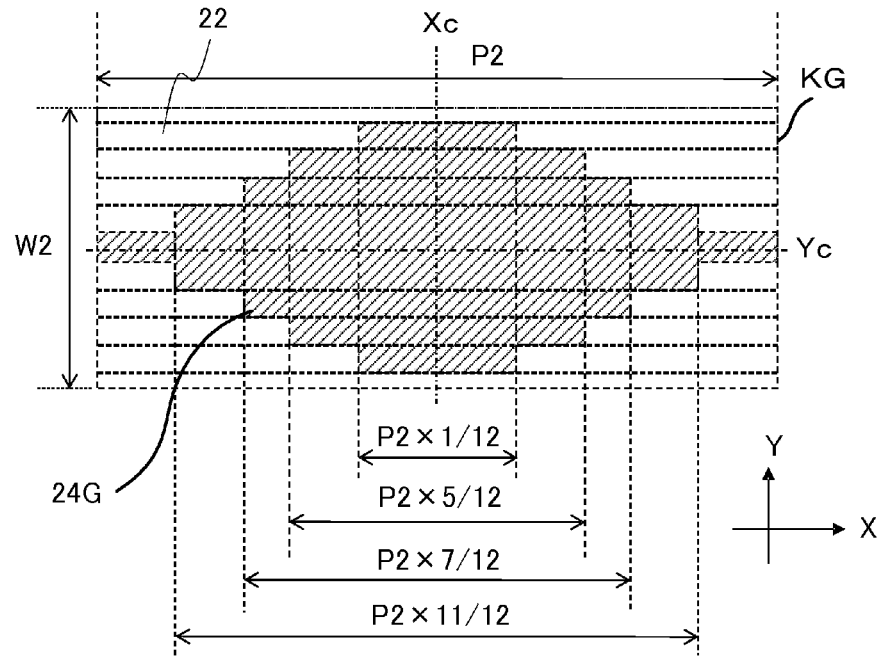
Figure 24C:
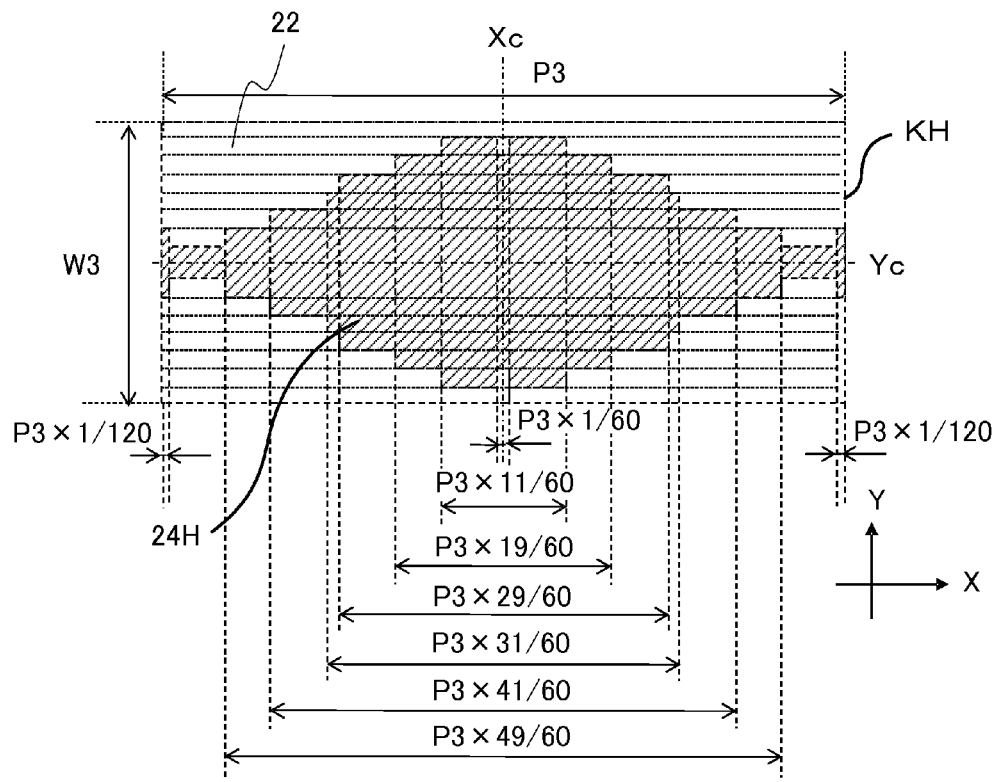

FIG. 24A is a plane view of a unit block pattern KF of the (first) area 23 for one period in the X direction. FIG. 24B is a plane view of a unit block pattern KG of the (second) area 25 for one period in the X direction. FIG. 24C is a plane view of a unit block pattern KH of the (third) area 28 for one period in the X direction.

The area 23 includes a pattern row in which a plurality of unit block patterns KC illustrated in FIG. 24A are arranged for each pitch P1 (=127.204969 μm) in the X direction. A width of the area 23 in the Y direction is W1=50 μm. The pitch P1 corresponds to a (first) modulation period of the area 23.

As illustrated in FIG. 24A, a width of the reflective portion 24F of the area 23 in the X direction differs according to a position in the unit block pattern in the Y direction. In sections with a distance Y of Y<1 μm from the centerline Yc, the reflective portion 24F is formed in the entire section in the X direction. In sections with a distance Y of 1 μm≤Y<W1·1/4 from the centerline Yc, the reflective portion 24F is formed in a range with a distance X of X<P1·1/3 from the centerline Xc. In sections with a distance Y of W1·1/4≤Y<W1·1/2−1 μm from the centerline Yc, the reflective portion 24F is formed in a range with a distance X of X<P1·1/6 from the centerline Xc. In sections with a distance Y of W1·1/2−1 μm≤Y from the centerline Yc, no reflective portion 24F is formed at all in the X direction. The reflective portion 24F has an approximately rhombic shape, and is symmetrically formed with respect to each of the centerlines Xc and Yc of the unit block pattern KF.

The area 25 includes a pattern row in which a plurality of unit block patterns KG illustrated in FIG. 24B are arranged for each pitch P2 (=256 μm) in the X direction. A width of the area 25 in the Y direction is W2=50 μm. The pitch P2 corresponds to a (second) modulation period of the area 25.

As illustrated in FIG. 24B, a width of the reflective portion 24G of the area 25 in the X direction differs according to a position in the unit block pattern in the Y direction. In sections with a distance Y of Y<1 μm from the centerline Yc, the reflective portion 24G is formed in the entire section in the X direction. In sections with a distance Y of 1 μm≤Y<1 μm+(W2−4 μm)·1/8 from the centerline Yc, the reflective portion 24G is formed in a range with a distance X of X<P2·11/24 from the centerline Xc. In sections with a distance Y of 1 μm+(W2−4 μm)·1/8≤Y<1 μm+(W2−4 μm)·2/8 from the centerline Yc, the reflective portion 24G is formed in a range with a distance X of X<P2·7/24 from the centerline Xc. In sections with a distance Y of 1 μm+(W2−4 μm)·2/8≤Y<1 μm+(W2−4 μm)·3/8 from the centerline Yc, the reflective portion 24G is formed in a range with a distance X of X<P2·5/24 from the centerline Xc. In sections with a distance Y of 1 μm+(W2−4 μm)·3/8≤Y<1 μm+(W2−4 μm)·4/8 from the centerline Yc, the reflective portion 24G is formed in a range with a distance X of X<P2·1/24 from the centerline Xc. In sections with a distance Y of 1 μm+(W2−4 μm)·4/8≤Y from the centerline Yc, no reflective portion 24G is formed at all in the X direction. The reflective portion 24G has an approximately rhombic shape, and is symmetrically formed with respect to each of the centerlines Xc and Yc of the unit block pattern KG.

The area 28 includes a pattern row in which a plurality of unit block patterns KH illustrated in FIG. 24C are arranged for each pitch P3 (=553.513514 μm) in the X direction. A width of the area 28 in the Y direction is W3=50 μm. The pitch P3 corresponds to a (third) modulation period of the area 28.

As illustrated in FIG. 24C, a width of the reflective portion 24H in the area 28 in the X direction differs according to a position in the unit block pattern in the Y direction. In sections with a distance Y of Y<1 μm from the centerline Yc, the reflective portion 24H is formed in the entire section in the X direction. In sections with a distance Y of 1 μm≤Y<1 μm+(W3−4 μm)/12 from the centerline Yc, the reflective portion 24H is formed in ranges with a distance X of X<P3·49/120 and P3·59/120≤X<P3·60/120 from the centerline Xc. In sections with a distance Y of 1 μm+(W3−4 μm)/12≤Y<1 μm+(W3−4 μm)·2/12 from the centerline Yc, the reflective portion 24H is formed in a range with a distance X of X<P3·41/120 from the centerline Xc. In sections with a distance Y of 1 μm+(W3−4 μm)·2/12≤Y<1 μm+(W3−4 μm)·3/12 from the centerline Yc, the reflective portion 24H is formed in a range with a distance X of X<P3·31/120 from the centerline Xc.

In sections with a distance Y of 1 μm+(W3−4 μm)·3/12≤Y<1 μm+(W3−4 μm)·4/12 from the centerline Yc, the reflective portion 24H is formed in a range with a distance X of X<P3·29/120 from the centerline Xc. In sections with a distance Y of 1 μm+(W3−4 μm)·4/12≤Y<1 μm+(W3−4 μm)·5/12 from the centerline Yc, the reflective portion 24H is formed in a range with a distance X of X<P3·19/120 from the centerline Xc. In sections with a distance Y of 1 μm+(W3−4 μm)·5/12≤Y<1 μm+(W3−4 μm)·6/12 from the centerline Yc, the reflective portion 24H is formed in a range with a distance X of P3·1/120<x<P3·11/120 from the centerline Xc. In sections with a distance Y of 1 μm+(W3−4 μm)·6/12≤Y from the centerline Yc, no reflective portion 24H is formed at all in the X direction. The reflective portion 24H has an approximately rhombic shape, and is symmetrically formed with respect to each of the centerlines Xc and Yc of the unit block pattern KH.

A description will now be given of a design method of the unit block patterns KF, KG, and KH.

The unit block pattern KF for the area 23 is designed to eliminate the third harmonic component, and made in accordance with the designing method of the first embodiment although the constants A and C in the expression 5 and 6 are set to different values. This embodiment sets C to 1 μm and A to (W−4 μm)/2. The unit block pattern KF is equal to the function Y(x) of the expression 7 having the constants A and C of this embodiment in the integration of the width of the reflective portion 24F in the Y direction. Under this condition, the unit block pattern KF illustrated in FIG. 24A is designed by arranging the sections symmetrically and in order of the opening ratio in the Y direction. This embodiment arranges sections in order of the X-directional opening ratio (a ratio of the reflective area) from the centerline Yc of the Y direction, but the order may be inverted. Since the sections having the opening ratios of 0% and 100% do not contribute to the generation of the harmonic component, a harmonic component reducing effect similar to the first embodiment can be obtained.

When FIG. 24A is compared with FIG. 13A, the unit block pattern KF includes, at the center, a rectangular section KFa that contains the symmetry line (second centerline) Yc, has a predetermined width, and extends in the X direction by the X-directional width P1 of the unit block pattern KF. The unit lock pattern KF further includes a pair of sections KFb each of which contains a side that determines the boundary of the unit block pattern KF in the Y direction and extends in the X direction. The section KFb has a predetermined width, and extends in the X direction by the width P1. This embodiment sets the opening ratio of the section KFa to 100%, and the opening ratio of the section KFb to 0%. Although this embodiment sets the half (Way/2) of the Y-directional width Way equal to the Y-directional width Wyb of the section KFb, but the size arrangement is not limited to this embodiment.

An actual width to a designed value is likely to scatter in the sections KFa and KFb, which are sections having extrema of the opening ratio of the pattern in the Y direction, due to an etching process (in particular, wet etching process) used to form the pattern of the reflective pattern 24F. In other words, due to the etching process, the width of the section having the maximum opening ratio is likely to become thinner, and the width of the section having the minimum opening ratio is likely to become thicker. This scattering shifts a ratio of each duty component and weakens a reducing effect of a harmonic distortion, or a phase relationship among neighboring patterns causes an unnecessary reflective area and increases waveform errors.

Accordingly, this embodiment sets the opening ratio of each of the sections KFa, KFb to 0% or 100% so as to maintain a monotonous increase or decrease of the opening ratio in the Y direction, because the sections having the opening ratios of 0% and 100% do not contribute to a generation of the harmonic component. As a result, in the sections that exclude the sections KFa and KFb that do not contribute to a generation of the modulated signal, the opening ratio can be maintained constant even when the widths scatter due to the etching.

When the opening ratio of the section KFa (that is a divided section having the highest opening ratio) is set to 100% and the opening ratio of the section KFb (that is a divided section having the lowest opening ratio) is set to 0% as in this embodiment, the opening ratio monotonously increases in the Y direction from 0% to 100%. In short, in the unit block pattern, in a direction from the divided section having the lowest opening ratio to the divided section having the highest opening ratio, the opening ratios of the divided sections between them monotonously increase and vice versa. In other words, in the unit block pattern, the opening ratios of one or more (or a plurality of) divided sections between the divided section having the highest opening ratio and the divided section having the lowest opening ratio monotonously decrease from the divided section having the highest opening ratio to the divided section having the lowest opening ratio.

According to FIG. 24A, the opening ratio of the section arranged between the section having the opening ratio of 0% and the section having the opening ratio of 100% in the upper side and the lower side of the centerline Yc is set so that the opening ratios increase from the outside to the centerline Yc. However, this arrangement may be inverted.

In this case, in the upper side of the centerline Yc, the sections are arranged in a direction from the centerline Yc to the upper side along the Y direction so that the opening ratios alternate in order of 0%, 33%, 67%, and 100%. Similarly, in the lower side of the centerline Yc, the sections are arranged in a direction from the centerline Yc to the lower side along the Y direction so that the opening ratios alternate in order of 0%, 33%, 67%, and 100%.

The symmetry of the opening ratio with respect to the centerline Yc is unnecessary. In addition, as illustrated in the sixth embodiment, the opening ratio may not monotonously increase or decrease from the centerline Yc to the upper side or the lower side.

The unit block pattern KG for the area 25 is designed to eliminate the second and third harmonic components, and made in accordance with the designing method of the unit block pattern KD of the third embodiment although the constants A and C in the expression 31 and 34 are set to different values. This embodiment sets C to 0.5 µm and A to (W−4 µm)/4. The unit block pattern KG is equal to the function Y(x) of the expression 35 having the constants A and C of this embodiment in the integration of the width of the reflective portion 24G in the Y direction. Under this condition, the unit block pattern KG illustrated in FIG. 24B is designed by arranging the sections symmetrically and in order of the opening ratio in the Y direction. This embodiment arranges sections in order of the X-directional opening ratio (a ratio of the reflective area) from the centerline Yc of the Y direction, but the order may be inverted. Since the sections having the opening ratios of 0% and 100% do not contribute to the generation of the harmonic component, a harmonic component reducing effect similar to the third embodiment can be obtained.

The unit block pattern KH for the area 28 is designed to eliminate the second, third, and fifth harmonic components, and made in accordance with the designing method of the unit block pattern KE of the third embodiment although the constants A and C in the expression 40 and 47 are set to different values. This embodiment sets C to 0.25 µm and A to (W−4 µm)/6. The unit block pattern KH is equal to the function Y(x) of the expression 48 having the constants A and C of this embodiment in the integration of the width of the reflective portion 24H in the Y direction. Under this condition, the unit block pattern KH illustrated in FIG. 24C is designed by arranging the sections symmetrically and in order of the opening ratio in the Y direction. This embodiment arranges areas in order of the X-directional opening ratio (a ratio of the reflective area) from the centerline Yc of the Y direction, but the order may be inverted. Since the areas having the opening ratios of 0% and 100% do not contribute to the generation of the harmonic component, a harmonic component reducing effect similar to the third embodiment can be obtained.

This embodiment sets to 0% or 100% each of the opening ratios of the sections KFa and KFb, which are arranged at the center and ends in the Y direction of the unit block pattern KF. This configuration can maintain approximately constant the width of the section which contributes to a generation of the harmonic component and provide a precise encoder, when the width scatters due to the etching, although the widths of the sections KFa and KFb in the Y direction may fluctuate. In addition, the monotonously increasing or decreasing arrangement of the opening ratio in the half region of the unit block pattern formed by the centerline Yc is likely to satisfy the conditional expression 1.

Sixth Embodiment

Figure 25:
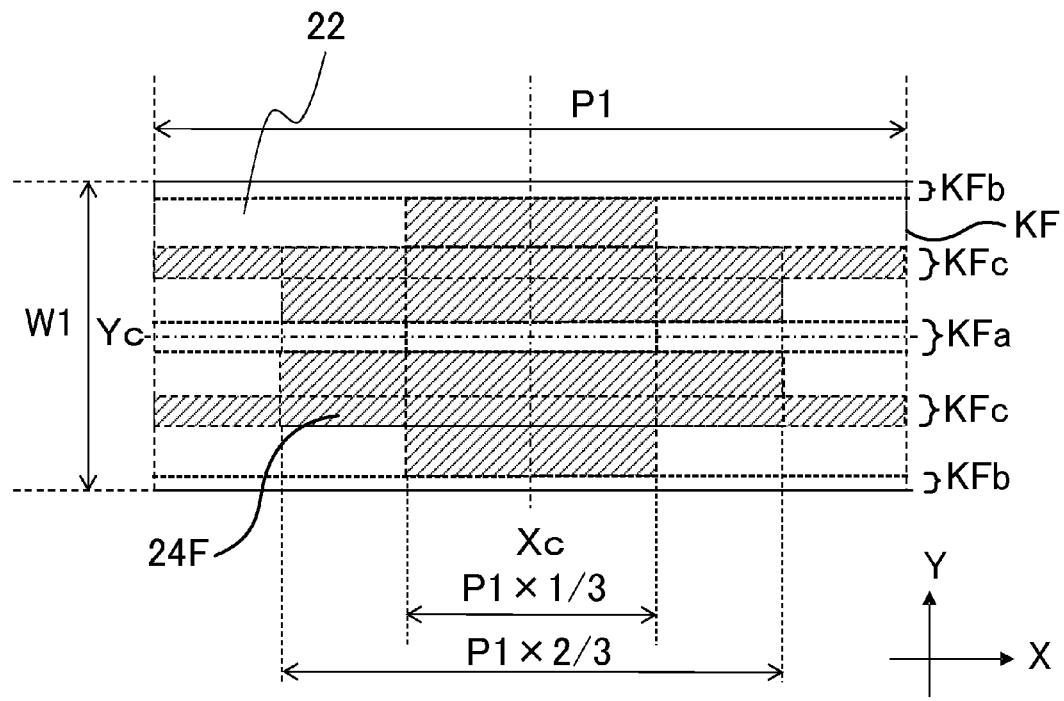
FIG. 25 is a partially enlarged plane view of FIG. 23 according to a sixth embodiment.

FIG. 25 is a plane view of another example of the unit block pattern KF for one period of the (first) area 23 of the fifth embodiment.

The area 23 includes a pattern row in which a plurality of unit block patterns KF illustrated in FIG. 25 are arranged for each pitch P1 (=127.204969 µm) in the X direction. A width of the area 23 in the Y direction is W1=50 µm. The pitch P1 corresponds to a (first) modulation period of the area 23.

As illustrated in FIG. 25, a width of the reflective portion 24F of the area 23 in the X direction differs according to a position in the unit block pattern in the Y direction. In sections with a distance Y of Y<1 µm from the centerline Yc, no reflective portion 24F is formed at all in the X direction. In sections with a distance Y of 1 µm≤Y<W1·1/4−1 µm from the centerline Yc, the reflective portion 24F is formed in a range with a distance X of X<P1·1/3 from the centerline Xc. In sections with a distance Y of W1·1/4−1 µm≤Y<W1·1/4+1 µm from the centerline Yc, the reflective portion 24F is formed in the entire section in the X direction. In sections with a distance Y of W1·1/4+1 µm≤Y<W1·1/2−1 µm from the centerline Yc, the reflective portion 24F is formed in a range with a distance X of X<P1·1/6 from the centerline Xc. In sections with a distance Y of W1·1/2−1 µm≤Y from the centerline Yc, no reflective portion 24F is formed at all in the X direction.

Similar to FIG. 24A, this embodiment sets the opening ratios of the sections KFa and KFb to the value (0% in this embodiment), which does not contribute to the generation of the modulated signal, while the monotonous increase or decrease of the opening ratios in the Y direction is maintained. As a result, in the sections that exclude the sections KFa and KFb that do not contribute to a generation of the modulated signal, the opening ratio can be maintained constant even when the width scatters at the center or the end due to the etching.

Different from FIG. 24A, this embodiment sets the opening ratio of the section KFa to 0%, and provides a section KFc having an opening ratio of 100%. Thereby, in the upper side of the centerline Yc (half area of the unit block pattern KF), the sections are arranged in a direction from the centerline Yc to the outside so that the opening ratios alternate in order of 0% (minimum value), 67%, 100% (maximum value), 33%, and 0%. While the opening ratio monotonously increases in the upper side of the centerline Yc of FIG. 24A, the opening ratios monotonously increase and then monotonously decrease from the maximum value of the opening ratio in this embodiment. The monotonous increase region of the opening ratio and the monotonous decrease region of the opening ratio may be repeated a plurality of times. This arrangement is likely to satisfy the expression 1, similarly to FIG. 24A. In general, as long as the pattern made by removing the sections having the opening ratio of 0% and 100% and by combining the residue sections in the Y direction satisfies the expression 1, the pattern detecting accuracy can be maintained.

This embodiment sets to 0% each of the opening ratios of the section KFa and KFb that are arranged at the center and the ends in the Y direction of the unit block pattern KF. This configuration can maintain approximately constant the width of the section which contributes to a generation of the harmonic component and provide a precise encoder, even when the width scatters at the center or the end due to the etching, and the widths of the sections KFa and KFb in the Y direction fluctuate. In addition, a monotonously increase or decrease of the opening ratio in the half region of the unit block pattern formed by the centerline Yc is likely to suffice the conditional expression 1.

Seventh Embodiment

Figure 26:
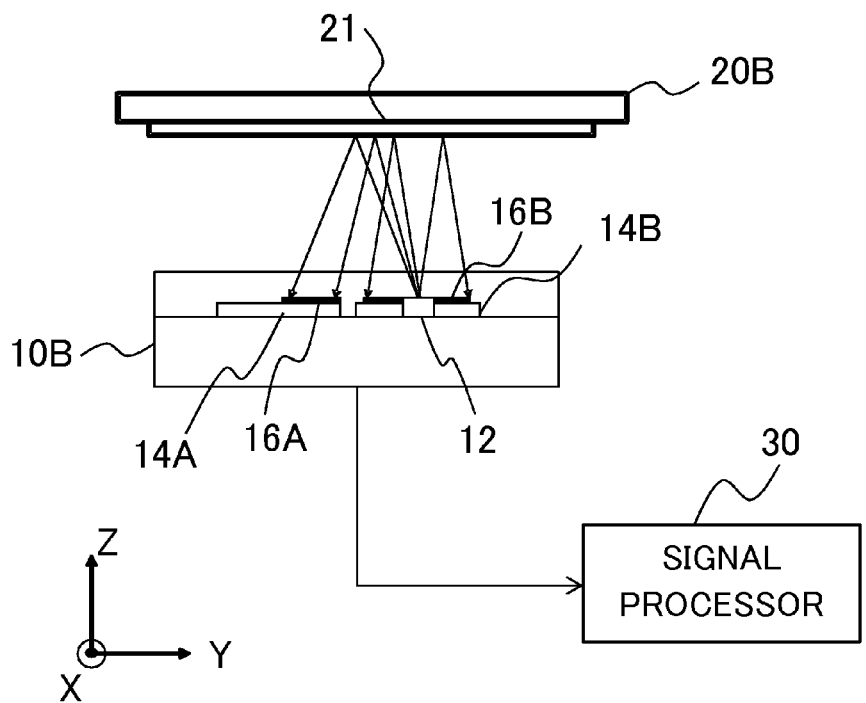
FIG. 26 is a block diagram of an encoder according to a seventh embodiment.

FIG. 26 is a block diagram of an encoder according to a seventh embodiment. The encoder includes a sensor unit 10B attached to a fixed unit, a scale 20B attached to a movable unit (not illustrated), and a signal processor 30. The scale 20B is configured movable in both of the X direction and the Y direction. A divergent light flux emitted from the light source 12 in the sensor unit 10B is irradiated onto the track 21 of the scale 20B, and the light flux reflected on the track 21 is received by two photodetector arrays 16A and 16B in the sensor unit 10B. Each of the photodetector arrays 16A and 16B receives an image in which a reflective index distribution of the track 21 is magnified twice. The light fluxes received by the photodetector arrays 16A and 16B are converted into electric signals, and sent to the signal processor 30. The photodetector array 16A is configured to detect a moving amount in the X direction, and the photodetector array 16B is configured to detect a moving amount in the Y direction. The signal processor 30 converts the output from each of the photodetector arrays 16A and 16B into positional information, and precisely obtains and outputs the information of the positions of the scale 20B in the X and Y directions.

Figure 27:
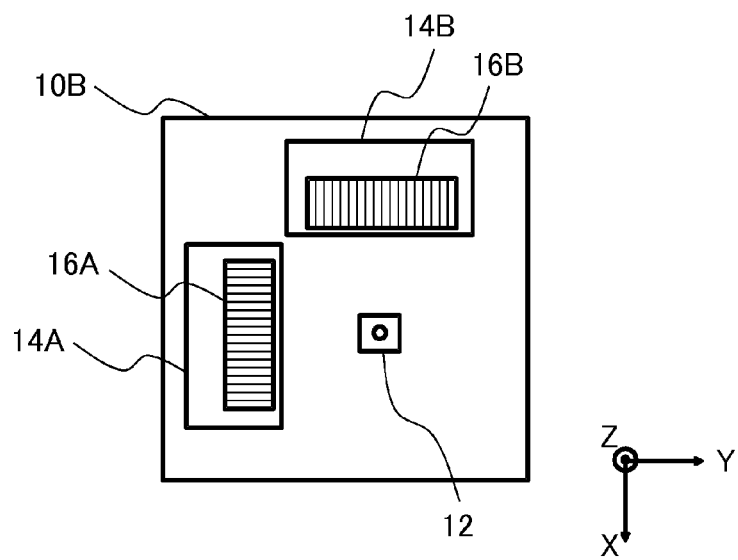
FIG. 27 is a block diagram of a sensor unit according to the seventh embodiment.

FIG. 27 is a view of the sensor unit 10B viewed from the Z direction. This embodiment provides the sensor unit 10B with two photodetector arrays 16A and 16B arranged by 90° in the XY plane.

Figure 28:
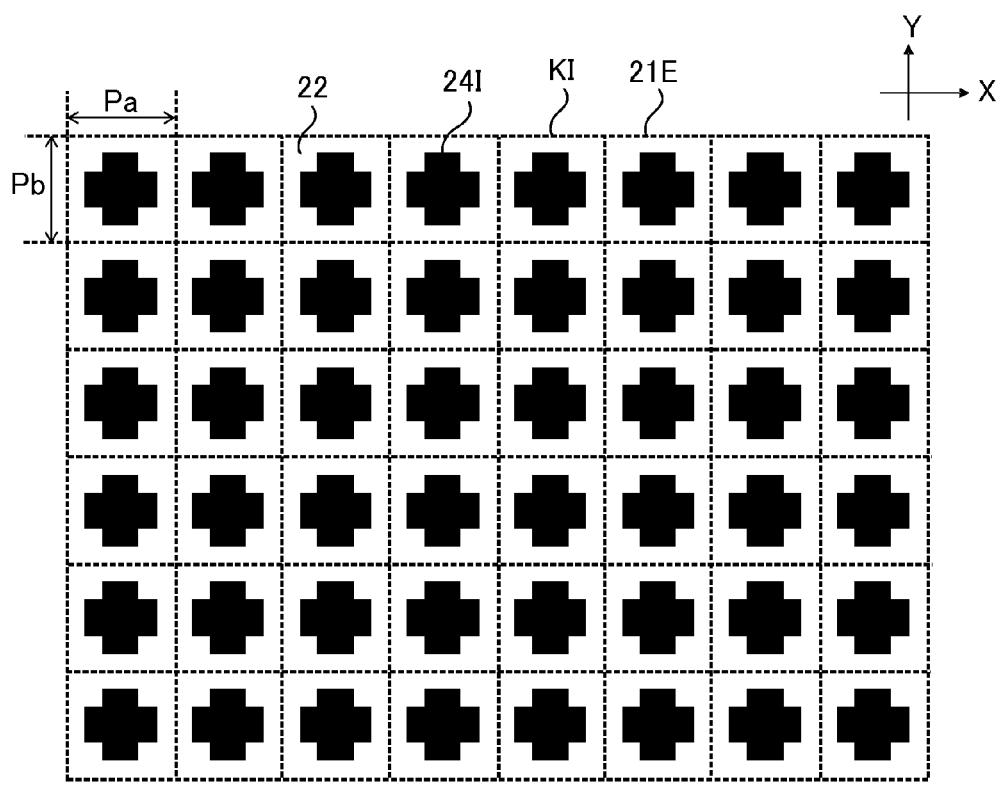
FIG. 28 is a partially enlarged plane view of a track according to a seventh embodiment.

FIG. 28 is a partially enlarged plane view of a track 21E applicable to the track 21 illustrated in FIG. 26. In the track 21E, a unit block pattern KI illustrated by a dotted line is periodically arranged in each moving direction (position measuring direction or X and Y directions) of the scale 20B. In FIG. 28, a white portion is a non-reflective portion 22 configured to transmit or absorb the light.

In this embodiment, the position measuring direction is each of two orthogonal directions, and the direction perpendicular to the position measuring direction when one of the two orthogonal directions is used to measure the position is the other of the two orthogonal directions. Hence, the expression 1 is satisfied not only in the X direction but also in the Y direction.

Figure 29:
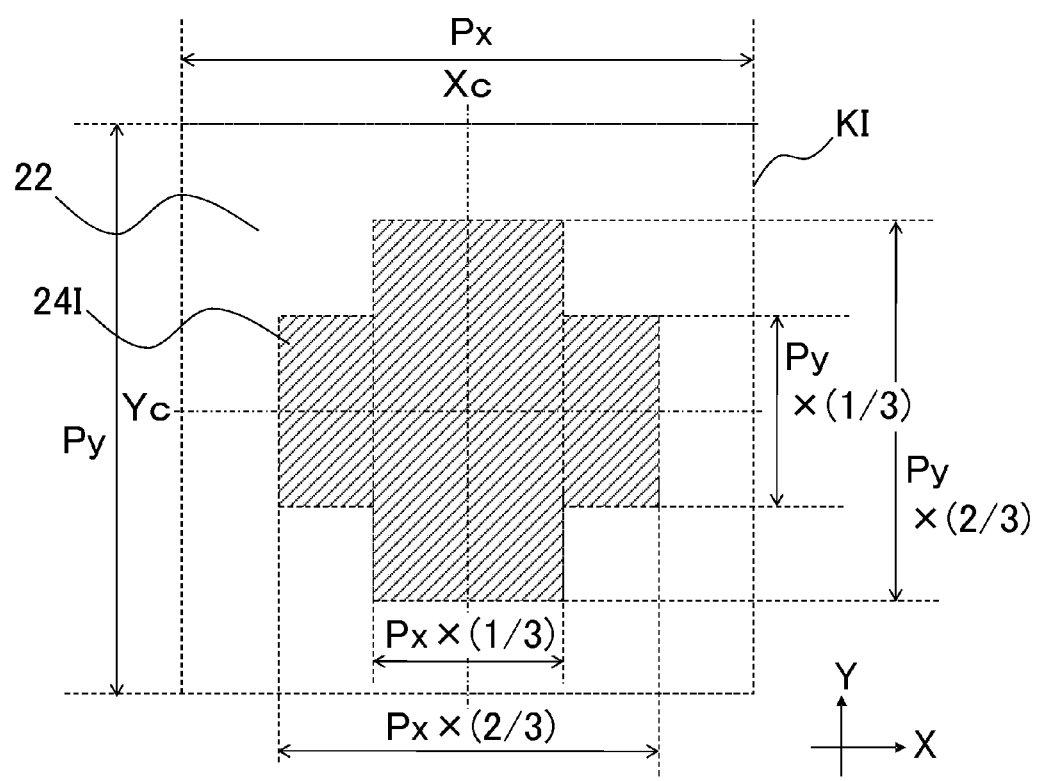
FIG. 29 is a partially enlarged plane view of a track according to the seventh embodiment.

FIG. 29 is an enlarged plane view of the unit block pattern KI. The unit block pattern KI has a width (pitch) Px of 64 μm in the X direction (first direction) and a width (pitch) Py of 64 μm in the Y direction (second direction), and includes a non-reflective portion 22 and a reflective portion 24I that is made of a reflective film and configured to reflect light.

A width of the reflective portion 24I in the X direction differs according to a position in the unit block pattern KI in the Y direction. In sections with a distance Y of Y<Py·1/6 from the centerline Yc, the reflective portion 24I is formed in a range with a distance X of X<Px·1/3 from the centerline Xc. In sections with a distance Y of Py·1/6≤Y<Py·1/3 from the centerline Yc, the reflective portion 24F is formed in a range with a distance X of X<P1·1/6 from the centerline Xc. In sections with a distance Y of Py·1/3≤Y from the centerline Yc, no reflective portion 24F is formed at all in the X direction. The reflective portion 24I has a cross shape, and is symmetrically formed with respect to each of the centerlines Xc and Yc of the unit block pattern KI.

The two photodetector arrays 16A and 16B of this embodiment are similar to that of the first embodiment illustrated in FIG. 3 although the width Ypd in the Y direction is different.

Ypd=512 μm in this embodiment. Since the projected scale pattern is magnified twice, the detectable range on the scale for the photodetector array 16A is 256 μm in the Y direction and 512 μm in the X direction. There are four unit block patterns KI in the Y direction in the detectable range of the scale for the photodetector array 16A.

A width integrated in the Y direction of the reflective area contained in the detectable range on the scale of the photodetector array 16A is equal to a total of a plurality of rectangular functions expressed as $4A \cdot rect(2 \cdot x/Px - 2N + (\ldots ((\pm 1/2a) \pm 1/2b) \pm 1/2c) \ldots)))$ using the position x. This embodiment sets "a" to 3 and "b" and subsequent orders to 0 so as to reduce the third harmonic component.

The detectable range on the scale of the photodetector array 16B is 512 μm in the Y direction and 256 μm in the X direction. Therefore, there are four unit block patterns KI in the X direction in the detectable range of the scale for the photodetector array 16B.

A width integrated in the Y direction of the reflective area contained in the detectable range on the scale of the photodetector array 16B is equal to a total of a plurality of rectangular functions expressed as $4A \cdot rect(2 \cdot y/Py - 2N + (\ldots ((\pm 1/2a) \pm 1/2b) \pm 1/2c) \ldots)))$ using the position y. This embodiment sets "a" to 3 and "b" and subsequent orders to 0 so as to reduce the third harmonic component.

While this embodiment sets Px and Py to an equal value, the present invention is not limited to this embodiment so as to obtain a similar effect even when Px and Py are different. In that case, the width of the detectable range on the scale in the Y direction for the photodetector array 16A is set an integer times as long as the width of the unit block pattern KI in the Y direction. The width of the detectable range on the scale in the X direction for the photodetector array 16B is set an integer times as long as the width of the unit block pattern KI in the X direction.

This embodiment utilizes an encoder for a two-dimensional detection, and provides an attenuating effect of the third harmonic component with respect to the detections in the X and Y directions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the present invention is applicable to a position detecting apparatus that includes the encoder of the present invention. This position detecting apparatus includes a movable unit, and the encoder configured to detect a position of the movable unit. The position of the movable unit can be precisely detected relative to a fixed unit by providing the scale to the movable unit and by providing the light source and the (photo-)detector to the fixed unit in the position detecting apparatus. The present invention is also applicable to an optical apparatus, such as a lens apparatus and an image-pickup apparatus. The optical apparatus includes an optical system that includes a movable optical unit, and the encoder of the present invention configured to detect a position of the movable optical unit. The movable optical unit includes a zoom lens unit that is movable during zooming, a focusing lens unit that is movable during focusing, or a stop that is driven when the light amount is adjusted. In the optical apparatus to which the present invention is applied, the position of the zoom lens unit or the focusing lens unit can be detected by providing the zooming or focusing lens unit to the scale and by providing the light source and the (photo-)detector to the fixed unit that is not moved during zooming or focusing.

The encoder is applicable to an application to detect a position (or displacement).

While this embodiment illustrates an optical encoder, the present invention is applicable to a magnetic encoder by replacing the reflective portion and the non-reflective portion (transmitting or the absorptive portion) with the S-pole and the N-pole and by replacing the light source and the (photo-)detector with a magnetic sensor.

This application claims the benefit of Japanese Patent Application No. 2011-088814, filed Apr. 13, 2011, which is hereby incorporated by reference herein in its entirety.

What is claimed is:

1. An encoder comprising a light source, a photodetector, a signal processing circuit, and a scale that includes a plurality of first unit block patterns each having a first pattern configured to transmit or reflect light from the light source toward the photodetector, wherein the photodetector generates sine wave signals from light detected by the photodetector, wherein the signal processing circuit includes an operation processor to acquire phase signals from the sine wave signals, wherein the plurality of first unit block patterns are adjacently arranged in a position measuring direction with a period of a pitch P(μm), wherein the size of the first unit block pattern in the direction perpendicular to the position measuring direction is smaller than the size of the detectable range of the scale by the photodetector in the direction perpendicular to the position measuring direction, wherein the first pattern of the first unit block pattern has a symmetrical shape with respect to a symmetry line perpendicular to the position measuring direction, wherein each first unit block pattern includes a plurality of divided sections along a direction perpendicular to the position measuring direction, wherein an area ratio of the first pattern in the position measuring direction which is a value made by dividing an area of the first pattern in each divided section by an area of the divided section is different between two adjacent divided sections, and wherein the first pattern in each divided section has a rectangular shape defined by two parallel lines that extend in the position measuring direction and two parallel lines that extend in the direction perpendicular to the position measuring direction.

2. The encoder according to claim 1, wherein the first pattern of each first unit block pattern has such a shape that an integration of a width of the first pattern in the direction perpendicular to the position measuring direction is equal to a total R(x) of a plurality of rectangular functions expressed by:

$$R(x)=A\times \text{rect}[(x-P\times N)/B+P/(2\times B)\times(\ldots(((\pm 1/(2\times a))\pm 1/(2\times b))\pm 1/(2\times c))\ldots)]-C$$

where rect is the rectangular function and 1 for $|h|\leq 1/2$ and 0 when $|h|\leq 1/2$ is not satisfied, x(μm) is a distance from the symmetry line in the position measuring direction, A, B(μm), C are arbitrary coefficients, a, b, c, ... are natural numbers, ". . ." means that terms continue likewise before $\pm 1/(2\times a)$ and after $\pm 1/(2\times c)$, and N is an *integer*.

3. The encoder according to claim 2, wherein B is half of the pitch P.

4. The encoder according to claim 2, wherein the total of the plurality of rectangular functions has a minimum value of 0 and a maximum value of a width of the first unit block pattern in the direction perpendicular to the position measuring direction.

5. The encoder according to claim 2, wherein the photodetector includes a detector array that includes a plurality of detectors configured to move relative to the scale and to detect a distribution of the light from the scale, the plurality of detectors being arranged in a moving direction, wherein a light-emitting region of the light source in the position measuring direction is as long as or shorter than 2P, wherein a divergent light flux is irradiated onto the scale from the light source, and wherein $Z>(P/m)^2/\lambda$ is satisfied where λ is a wavelength of the light, Z is a distance between the scale and a detecting surface of the detector, and m is a maximum value among the natural numbers a, b, c ....

6. The encoder according to claim 2, wherein the photodetector includes a detector array that includes a plurality of detectors configured to move relative to the scale and to detect a distribution of the light from the scale, the plurality of detectors being arranged in a moving direction, and wherein the encoder further comprises a collimator lens configured to convert a light flux from the light source into a plane wave, the light from the light source which has passed the collimator lens being irradiated onto the scale, wherein $Z>(P/m)^2/(2\cdot\lambda)$ where λ is a wavelength of the light, Z is a distance between the scale and a detecting surface of the detector, and m is a maximum value among the natural numbers a, b, c, ....

7. The encoder according to claim 1, wherein the first pattern of each first unit block pattern is symmetrical with respect to a symmetry line that extends in the position measuring direction.

8. The encoder according to claim 1, wherein the scale further includes a plurality of second unit block patterns different from the first unit block patterns,
   wherein the plurality of second unit block patterns are adjacently arranged in the position measuring direction with a period of a pitch different from the pitch P(μm),
   wherein the size of the first unit block pattern in the direction perpendicular to the position measuring direction is smaller than the size of the detectable range of the scale by the photodetector in the direction perpendicular to the position measuring direction,
   wherein each of the plurality of second unit block patterns has a second pattern configured to transmit or reflect the light from the light source toward the photodetector,
   wherein the second pattern has a symmetrical shape with respect to a symmetry line perpendicular to the position measuring direction,
   wherein each second unit block pattern includes a plurality of divided sections along the direction perpendicular to the position measuring direction,
   wherein an area ratio of the second pattern in the position measuring direction which is a value made by dividing an area of the second pattern in each divided section of the second unit block pattern by an area of the divided section of the second unit block pattern is different between two adjacent divided sections of the second unit block pattern, and
   wherein the second pattern in each divided section of the second unit block pattern has a rectangular shape defined by two parallel lines that extend in the position measuring direction and two parallel lines that extend in the direction perpendicular to the position measuring direction.

9. The encoder according to claim 1, wherein in one of the plurality of divided sections, a width of the first pattern in the position measuring direction is equal to a width of the unit block pattern in the position measuring direction.

10. The encoder according to claim 1, wherein one of the plurality of divided sections in the first unit block pattern has no first pattern.

11. The encoder according to claim 1, wherein the plurality of divided sections include a first divided section having the highest area ratio of the first pattern, a second divided section having the lowest area ratio of the first pattern, and one or more divided sections arranged between the first and second divided sections, and
   wherein the area ratios of the first pattern in the one or more divided sections monotonically decrease from the first divided section to the second divided section.

12. The encoder according to claim 11, wherein a width of the first pattern of the first divided section in the position measuring direction is equal to a width of the first divided section in the position measuring direction, and the second divided section has no first pattern.

13. The encoder according to claim 1, wherein the position measuring direction is each of two orthogonal directions, and the direction perpendicular to the position measuring direction when one of the two orthogonal directions is used to measure a position is the other of the two orthogonal directions.

14. A position detecting apparatus comprising:
   a movable unit; and
   an encoder configured to detect a position of the movable unit,
   wherein the encoder includes a light source, a photodetector, a signal processing circuit, and a scale that includes a plurality of unit block patterns each having a pattern configured to transmit or reflect light from the light source toward the photodetector,
   wherein the photodetector generates sine wave signals from light detected by the photodetector,
   wherein the signal processing circuit includes an operation processor to acquire phase signals from the sine wave signals,
   wherein the plurality of unit block patterns are adjacently arranged in a position measuring direction with a period of a pitch P(μm),
   wherein the size of the first unit block pattern in the direction perpendicular to the position measuring direction is smaller than the size of the detectable range of the scale by the photodetector in the direction perpendicular to the position measuring direction,
   wherein the pattern of the unit block pattern has a symmetrical shape with respect to a symmetry line perpendicular to the position measuring direction,
   wherein each unit block pattern includes a plurality of divided sections along a direction perpendicular to the position measuring direction,
   wherein an area ratio of the pattern in the position measuring direction which is a value made by dividing an area of the pattern in each divided section by an area of the divided section is different between two adjacent divided sections, and
   wherein the pattern in each divided section has a rectangular shape defined by two parallel lines that extend in the position measuring direction and two parallel lines that extend in the direction perpendicular to the position measuring direction.

15. An optical apparatus comprising:
   an optical system that includes a movable optical unit; and
   an encoder configured to detect a position of the movable optical unit,
   wherein the encoder includes a light source, a photodetector, a signal processing circuit, and a scale that includes a plurality of unit block patterns each having a pattern configured to transmit or reflect light from the light source toward the photodetector,
   wherein the photodetector generates sine wave signals from light detected by the photodetector,
   wherein the signal processing circuit includes an operation processor to acquire phase signals from the sine wave signals,
   wherein the plurality of unit block patterns are adjacently arranged in a position measuring direction with a period of a pitch P(μm),
   wherein the size of the first unit block pattern in the direction perpendicular to the position measuring direction is smaller than the size of the detectable range of the scale by the photodetector in the direction perpendicular to the position measuring direction,
   wherein the pattern of the unit block pattern has a symmetrical shape with respect to a symmetry line perpendicular to the position measuring direction,
   wherein each unit block pattern includes a plurality of divided sections along a direction perpendicular to the position measuring direction,
   wherein an area ratio of the pattern in the position measuring direction which is a value made by dividing an area of the pattern in each divided section by an area of the divided section is different between two adjacent divided sections, and
   wherein the pattern in each divided section has a rectangular shape defined by two parallel lines that extend in the position measuring direction and two parallel lines that extend in the direction perpendicular to the position measuring direction.

16. A scale comprising a plurality of unit block patterns each having a pattern configured to transmit or reflect light from a light source toward a photodetector,
wherein the plurality of unit block patterns are adjacently arranged in a position measuring direction with a period of a pitch P(μm),
wherein the size of the first unit block pattern in the direction perpendicular to the position measuring direction is smaller than the size of the detectable range of the scale by the photodetector in the direction perpendicular to the position measuring direction,
wherein the pattern of the unit block pattern has a symmetrical shape with respect to a symmetry line perpendicular to the position measuring direction,
wherein each unit block pattern includes a plurality of divided sections along a direction perpendicular to the position measuring direction,
wherein an area ratio of the pattern in the position measuring direction which is a value made by dividing an area of the pattern in each divided section by an area of the which is a value made by dividing an area of the pattern in each divided section by an area of the divided section is different between two adjacent divided sections, and
wherein the pattern in each divided section has a rectangular shape defined by two parallel lines that extend in the position measuring direction and two parallel lines that extend in the direction perpendicular to the position measuring direction.

17. The scale according to claim 16, wherein the pattern of each unit block pattern has such a shape that an integration of a width of the pattern in the direction perpendicular to the position measuring direction is equal to a total R(x) of a plurality of rectangular functions expressed by:

$$R(x) = A \times \text{rect}[(x - P \times N)/B + P/(2 \times B) \times (\ldots(((\pm 1/(2 \times a)) \pm 1/(2 \times b)) \pm 1/(2 \times c))\ldots)] - C$$

where rect is the rectangular function and 1 for $|h| \le 1/2$ and 0 when $\le 1/2$ is not satisfied, x(μm) is a distance from the symmetry line in the position measuring direction, A, B(μm), C are arbitrary coefficients, a, b, c, . . . are natural numbers, ". . ." means that terms continue likewise before $\pm 1/(2 \times a)$ and after $\pm 1/(2 \times c)$, and N is an integer.

* * * * *